(12) United States Patent
Leprevost

(10) Patent No.: US 7,230,619 B2
(45) Date of Patent: Jun. 12, 2007

(54) USE OF SIGMA-WEIGHTED DARKMAPS FOR TEXTURE MAP PROCESSING

(75) Inventor: Jean-Christophe Leprevost, Surrey (GB)

(73) Assignee: Criterion Software Limited, Surrey (GB)

( * ) Notice: Subject to any disclaimer, the term of this patent is extended or adjusted under 35 U.S.C. 154(b) by 148 days.

(21) Appl. No.: 10/339,307

(22) Filed: Jan. 10, 2003

(65) Prior Publication Data
US 2004/0066386 A1 Apr. 8, 2004

(30) Foreign Application Priority Data
Oct. 4, 2002 (GB) .................. 0223049.8

(51) Int. Cl.
*G06T 15/60* (2006.01)
*G06T 15/50* (2006.01)
*G06T 15/10* (2006.01)
*G06T 17/00* (2006.01)
*G06T 1/00* (2006.01)
*G06T 15/00* (2006.01)
*G09G 5/00* (2006.01)

(52) U.S. Cl. .................. 345/426; 345/418; 345/419; 345/420; 345/427; 345/581; 345/582

(58) Field of Classification Search ........ 345/418–420, 345/426, 427, 581, 582, 589
See application file for complete search history.

(56) References Cited

U.S. PATENT DOCUMENTS

| | | | |
|---|---|---|---|
| 4,965,745 A | * | 10/1990 | Economy et al. ........... 345/592 |
| 5,384,912 A | * | 1/1995 | Ogrinc et al. ............... 345/501 |
| 5,710,876 A | * | 1/1998 | Peercy et al. ............... 345/426 |
| 5,742,749 A | * | 4/1998 | Foran et al. ................ 345/426 |

(Continued)

FOREIGN PATENT DOCUMENTS

EP 0 775 981 A2 5/1997

OTHER PUBLICATIONS

Benchmark Insider, "Rendering 3D WinMark, part I", www.veritest.com, Dec. 1998.*

(Continued)

*Primary Examiner*—Ulka Chauhan
*Assistant Examiner*—Jeffrey J. Chow
(74) *Attorney, Agent, or Firm*—Townsend and Townsend and Crew LLP

(57) ABSTRACT

A respective weighting value is calculated for each texel in a texture map that is to be used to render a 3D computer model, the weighting value being calculated in dependence upon the red, green and blue values of the texel. Each weighting value is stored as an alpha value in the alpha channel for the corresponding texel in the texture map. During rendering, the texture map is rendered onto a polygon to generate R, G, B pixel values in the frame buffer together with a respective weighting value for each pixel comprising the weighting value calculated for the corresponding texel in the texture map, which is stored in the alpha channel for the pixel. A darkmap is rendered onto the polygon by subtracting from the pixel values in the frame buffer the darkmap values modulated by the frame buffer alpha values. The texel weighting values are calculated so that they have properties which result in a realistic image being generated.

47 Claims, 10 Drawing Sheets

U.S. PATENT DOCUMENTS

| | | | |
|---|---|---|---|
| 6,078,332 A | 6/2000 | Ohazama | 345/426 |
| 6,169,553 B1* | 1/2001 | Fuller et al. | 345/427 |
| 6,570,575 B1* | 5/2003 | Wittenbrink | 345/592 |
| 6,571,328 B2* | 5/2003 | Liao et al. | 712/35 |
| 6,731,297 B1* | 5/2004 | Leung et al. | 345/582 |
| 6,825,851 B1* | 11/2004 | Leather | 345/584 |
| 2003/0025706 A1* | 2/2003 | Ritter | 345/582 |
| 2003/0030639 A1* | 2/2003 | Ritter | 345/426 |
| 2003/0058238 A1* | 3/2003 | Doak et al. | 345/419 |
| 2004/0075663 A1* | 4/2004 | Plante | 345/474 |
| 2004/0150642 A1* | 8/2004 | Borshukov et al. | 345/426 |
| 2004/0155879 A1* | 8/2004 | Mittring | 345/426 |
| 2005/0046639 A1* | 3/2005 | Leather | 345/584 |

OTHER PUBLICATIONS

Benchmark Insider, "Rendering 3D WinMark, part II", www.veritest.com, Jan. 1999.*

Nuydens, Tom, "Lightmapping", www.delphi3d.net, Dec. 28, 2001.*

Nuydens, Tom, "Radiosity lighting", www.delphi3d.net, Dec. 5, 2002.* www.planetquake.com, "texture Blending Examples", Nov. 18, 2001.* www.gamedev.net, 2000-2001.*

"*Lightmapping*" available at: http://www.delphi3d.net/articles/printarticie.php?article=lightmapping.htm.

Foley, J., et al., "*Computer Graphics Principles and Practice,*" Addison-Wesley Publishing Company, Second Edition in C, Sections 13.3.1 and 13.3.3, ISBN 0201848406.

"*Lightmaps (Static Shadowmaps)*," posted Aug. 16, 1999, available at: http://www.flipcode.com/tutorials/tut_lightmaps.shtml.

* cited by examiner

USE OF SIGMA-WEIGHTED DARKMAPS FOR TEXTURE MAP PROCESSING

BACKGROUND OF THE INVENTION

1. Field of the Invention

The present invention relates to the field of three-dimensional (3D) computer graphics, and in particular to the use of texture maps and lightmaps to render an image of a 3D computer model.

2. Related Background Art

The use of texture maps and lightmaps is widely known in the field of three-dimensional computer graphics.

In texture mapping, a two-dimensional (2D) image is mapped onto a surface primitive representing part of an object to generate visible surface pattern detail on the surface. The image to be mapped onto the surface is called a texture map, and its individual elements are called texels, each having a plurality of colour component values defining an image value. The use of texture mapping allows surface detail to be represented in high resolution without using a large number of polygons or other geometric primitives to model the detail.

A single texture map is often repeatedly mapped onto many surface primitives. For example, a texture map comprising an image of a brick may be repeatedly mapped onto different surface primitives representing one or more walls. However, the lighting may vary from wall to wall or over different parts of the same wall depending upon the positions of the light sources.

Lightmapping offers a solution to this problem. A lightmap is an image comprising a 2D array of "lumels", each comprising a plurality of colour component values defining an illumination value representing the intensity of the light at that location on a surface primitive, and the lightmap is applied to a surface primitive together with the texture map. Thus, each surface primitive is rendered with two textures—one representing the surface pattern and one representing the illumination, to give a realistic looking primitive in the image.

In order to generate a 3D computer model at acceptable real-time frame rates (that is 25 or 30 frames per second) using texture mapping and lightmapping, it is currently necessary to use hardware to accelerate the processing.

The hardware processing capabilities determine how a texture map and a lightmap are applied to a surface primitive.

More particularly, if the hardware supports vector-modulating multiplication to the frame buffer during rendering (such that R1, G1, B1 multiplied by R2, G2, B2 is R1×R2, G1×G2, B1×B2—where R, G and B represent red, green and blue values respectively for a pixel) then a first pass is performed to render the texture map onto the surface polygon in the frame buffer followed by a second pass in which the pixel values resulting from the first pass are modulated with the lightmap values in accordance with vector-modulating multiplication.

However, not all hardware platforms support vector-modulating multiplication to the frame buffer; some only support vector subtraction and scalar multiplication. In this case, the lightmap is inverted (to give what is known as a "darkmap") and the inverted lightmap (darkmap) is subtracted from the rendered texture map values in the frame buffer, for example as suggested in the article "Lightmapping" at http://www.delphi3d.net/articles/printarticle.php?article=lightmapping.htm.

One problem, however, with the subtraction of darkmaps from textured images is that the resulting images often have undesirable visual properties, a particular one being that they may appear very dark.

SUMMARY OF THE INVENTION

The present invention aims to provide a solution whereby an image with improved appearance is generated when a texture map and a darkmap are applied to a surface primitive using a hardware system that does not support vector-modulating multiplication.

According to the present invention, there is provided a method, apparatus and computer program product for generating weighting values for texels in a texture map, so that, during rendering of the texture map and a darkmap onto a surface primitive, each colour component value of a darkmap element can be modulated by the weighting value for a texel before the modulated colour component darkmap values are subtracted from the texel colour component values to give an image pixel value.

The texel weighting values have properties which result in realistic looking images irrespective of the texel and darkmap values. More particularly, each texel weighting value is a weighted combination of colour component values for the texel, in which each colour component value contributes to the weighting value unless the colour component value itself is zero.

Preferably, the relative contributions of the different colour component values to the weighting value are based upon the relative sensitivity of the human eye to each colour component.

In a first embodiment, each texel weighting value is calculated in accordance with a predetermined equation using colour component values read from the texel for which the weighting value is to be calculated.

In a second embodiment, texel weighting values are precalculated and stored for different colour component values and, when a weighting value is to be generated for a texel, the weighting value precalculated for colour component values closest to those of the texel is read from storage. This read value may then be used as the weighting value for the texel, or it may be used to generate a more accurate value for the texel, for example by interpolating between two read values.

BRIEF DESCRIPTION OF THE DRAWING

Embodiments of the invention will now be described, by way of example only, with reference to the accompanying drawings, in which like reference numbers are used to designate like parts, and in which:

Figures 6A, 6B, 6C:
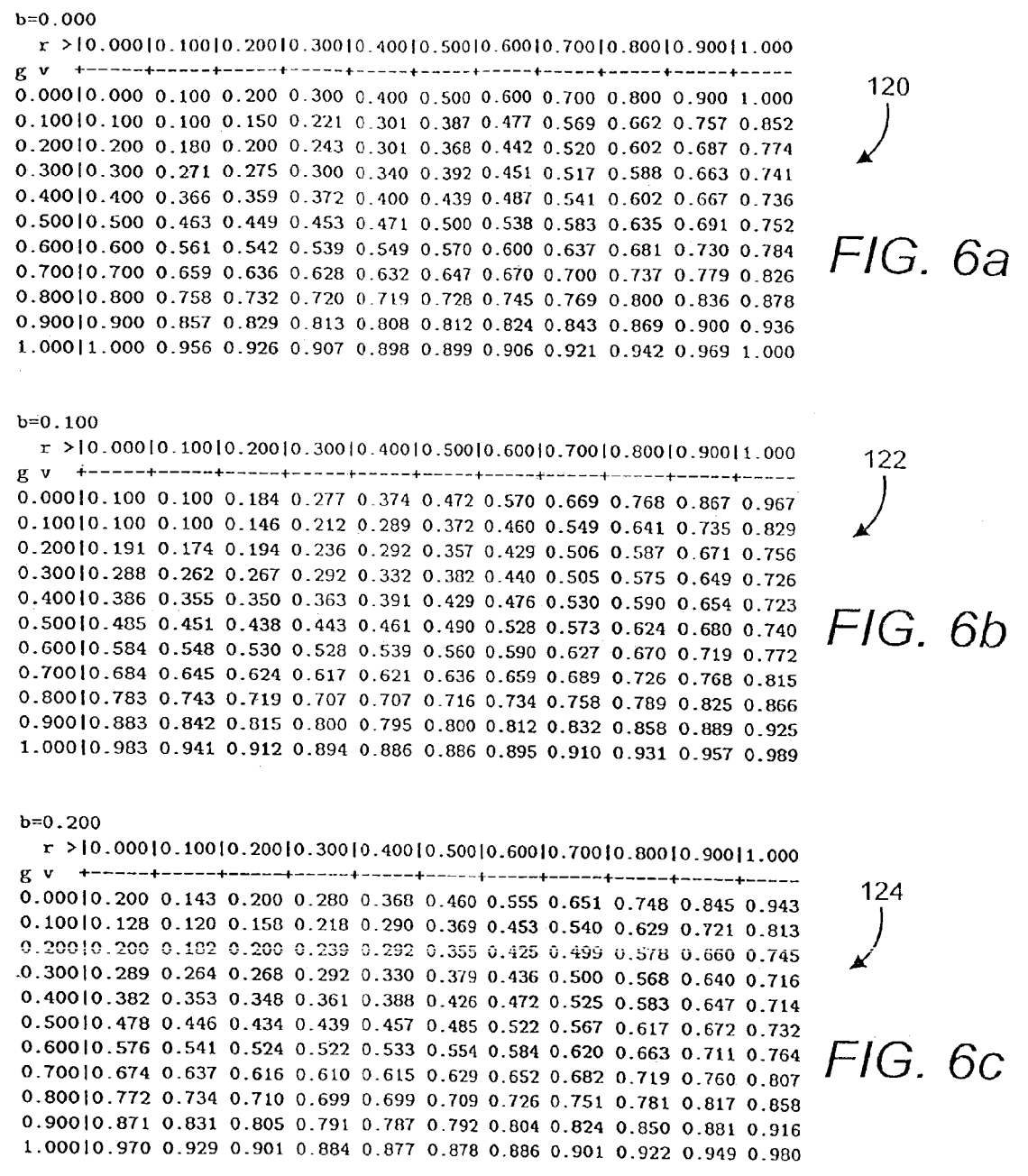
Figures 6D, 6E, 6F:
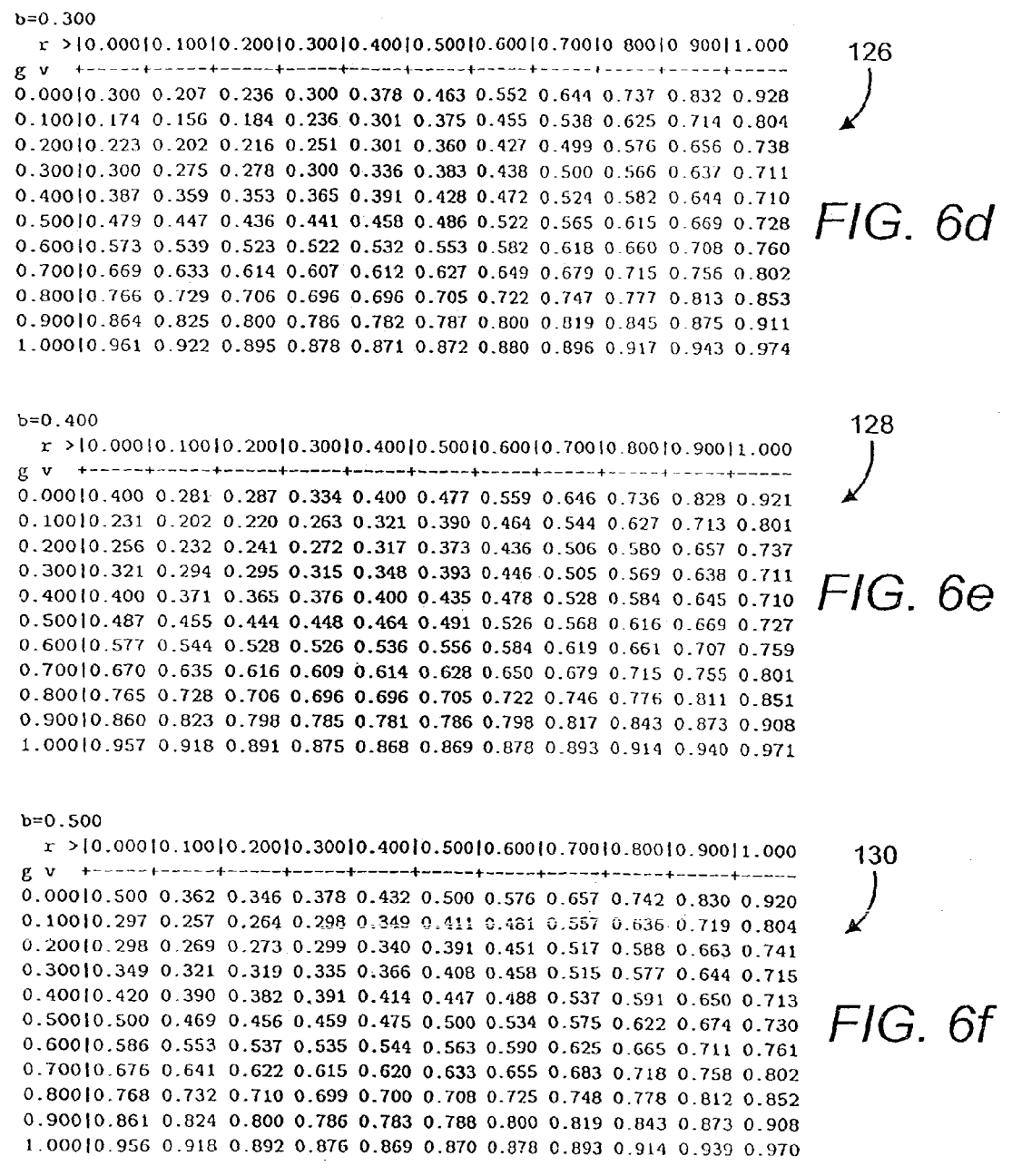
Figures 6G, 6H, 6I:
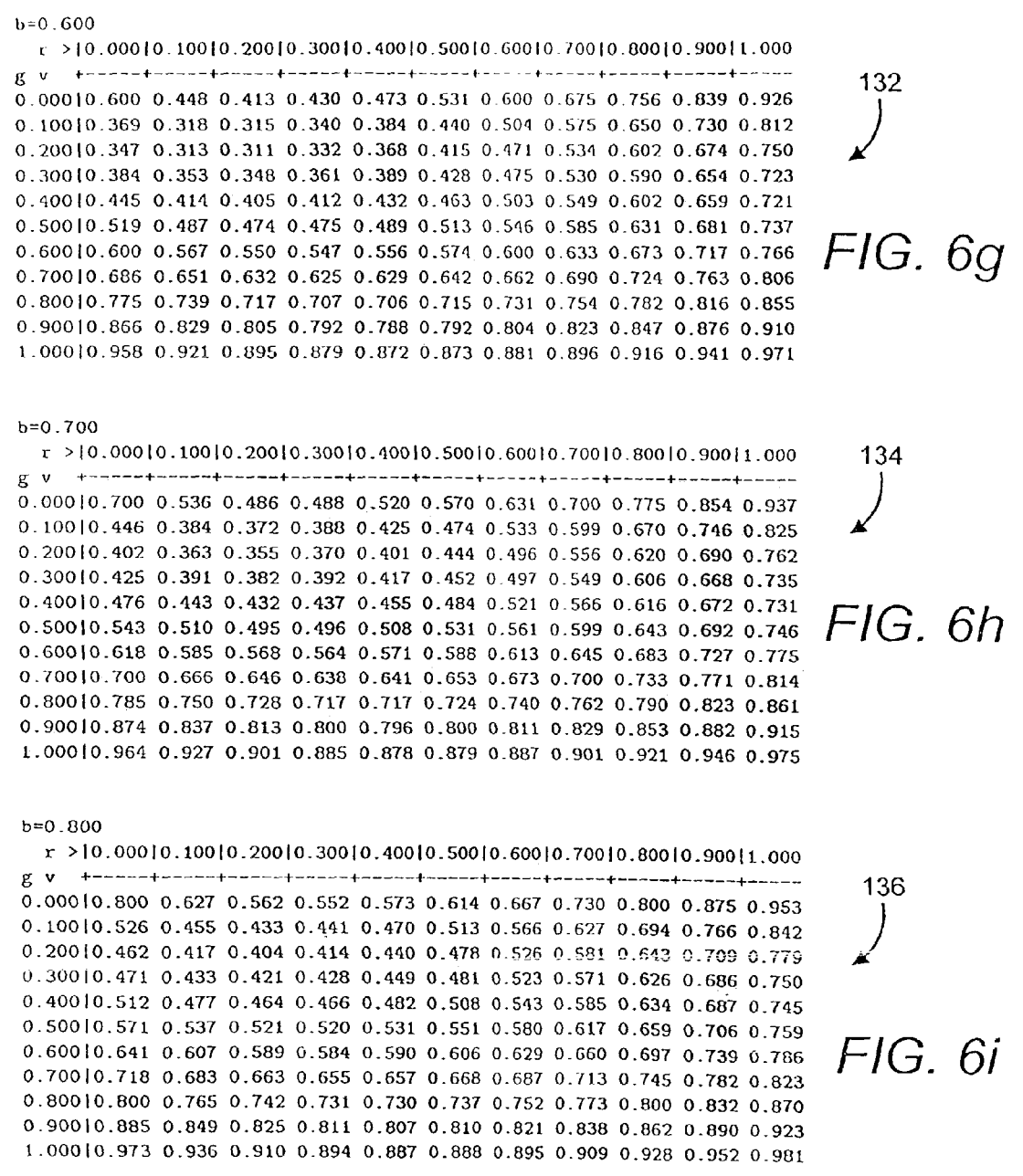
Figures 6J, 6K:
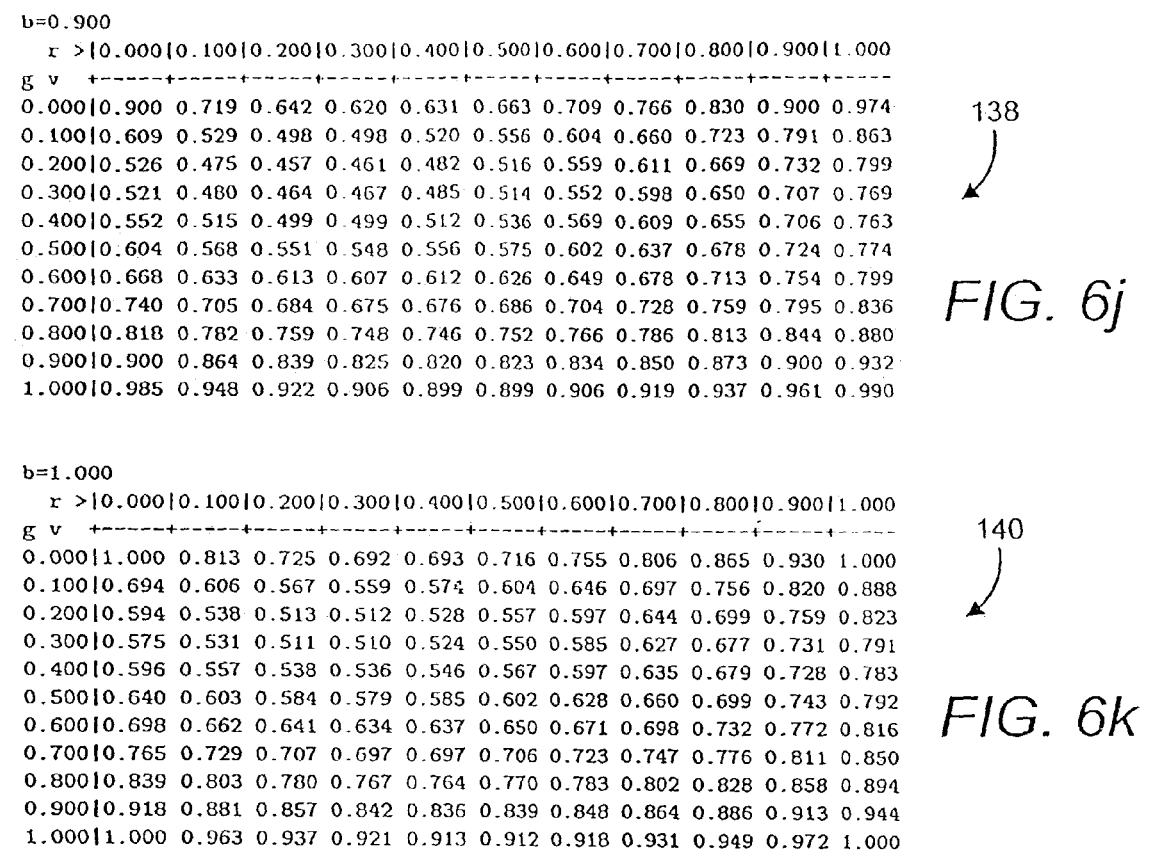

FIGS. 6a to 6k show look-up tables for use in the processing at step S4-6 of FIG. 4 to calculate a weighting value in a third embodiment.

DETAILED DESCRIPTION OF THE PREFERRED EMBODIMENTS

As will be explained below, in the preferred embodiments of the invention, processing is carried out to calculate a respective weighting value for each texel in a texture map that is to be used to render a 3D computer model, the weighting value being calculated in dependence upon the red, green and blue (R, G and B) values of the texel.

Each weighting value is stored as an alpha value in the alpha channel for the corresponding texel in the texture map. Consequently, each texel value in a texture map comprises an R value, a G value, a B value, and a weighting value.

During rendering, the texture map is rendered onto a polygon to generate R, G, B pixel values in the frame buffer together with a respective weighting value for each pixel (comprising the weighting value calculated for the corresponding texel in the texture map), which is stored in the alpha channel for the pixel. A darkmap is then rendered onto the polygon by subtracting from the pixel values in the frame buffer the darkmap values modulated by the frame buffer alpha values.

As will be explained below, the method used to calculate the respective weighting value for each texel in a texture map is such that the calculated weighting values have properties which result in a realistic image being generated irrespective of the R, G, B values of the texels in the texture map and the R, G, B values of the elements in the darkmap which are combined to generate the image.

In the embodiments below, a development toolkit comprising a library of respective software computer programs is supplied to a game development apparatus. The supplied programs from the library are then used in the development apparatus to generate compiled software defining a 3D graphics application (a computer game in the embodiments) which includes darkmaps and texture maps for use in rendering, the texture maps having the weighting values described above stored as alpha values.

The compiled game code is supplied to a game platform equipped with hardware to carry out scalar multiplication and vector subtraction of values in the frame buffer and darkmap values. Rendering using the texture maps and darkmaps is then performed by the game platform.

Accordingly, the generation of darkmaps, the calculation of weighting values for texture maps, and the rendering of darkmaps and texture maps is described in this context.

However, other embodiments are, of course, possible.

First Embodiment

Figure 1:
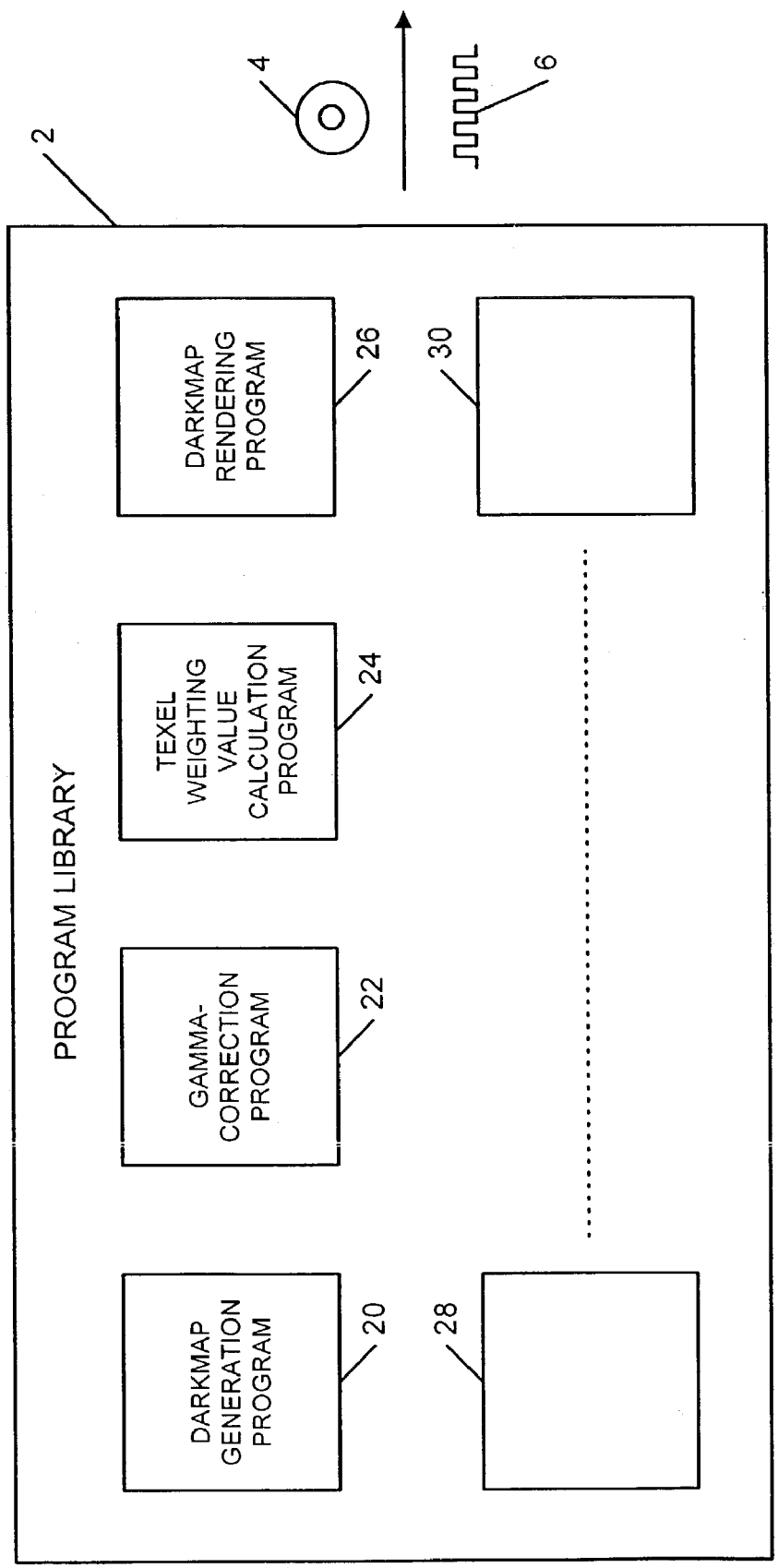
FIG. 1 schematically illustrates the contents of a software development toolkit in an embodiment.
Figure 2:
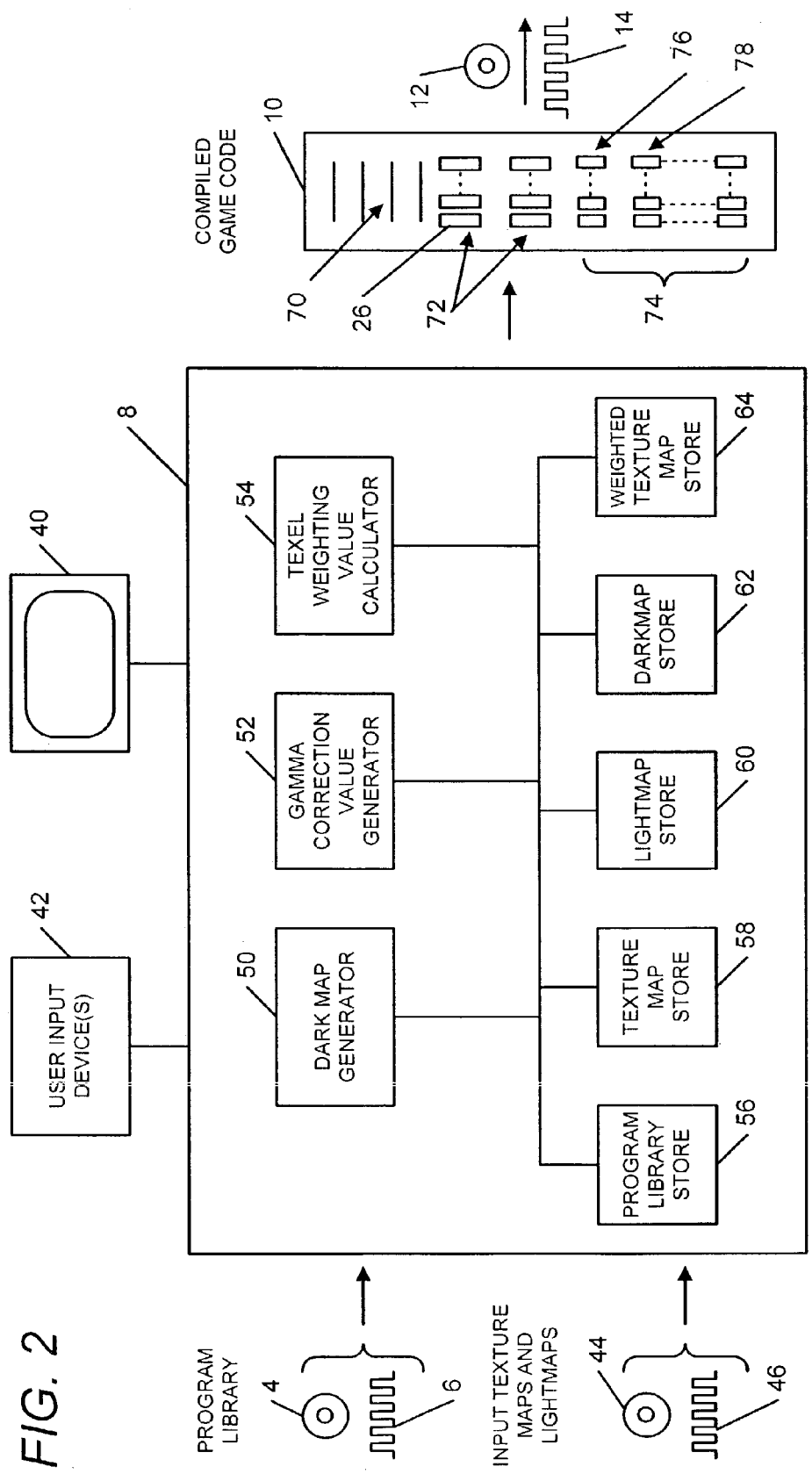
FIG. 2 schematically shows some of the notional functional processing units and data stores into which a game developer apparatus may be thought of as being configured when programmed by programming instructions including those from the software development toolkit of FIG. 1, and schematically shows the contents of a game product developed using the game developer apparatus.
Figure 3:
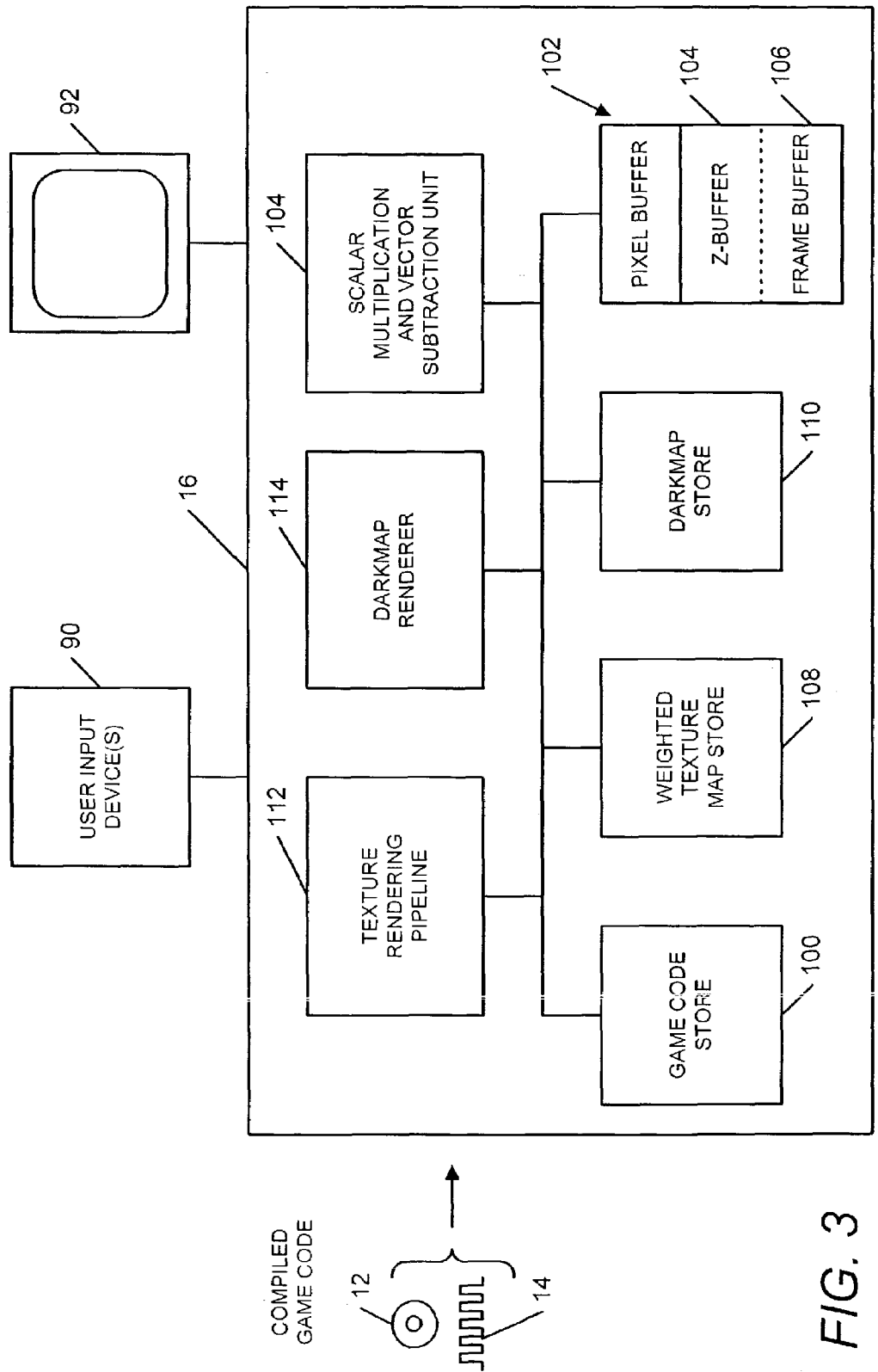
FIG. 3 schematically illustrates a programmable game platform for playing a game in accordance with game code developed by the game developer apparatus of FIG. 2, and also shows some of the notional functional processing units and data stores into which the programmable game platform may be thought of as being configured when programmed by the programming instructions of the game code.

Referring to FIGS. 1, 2 and 3, an overview of the generation and use of a 3D computer graphics game will be described first.

A software development toolkit comprising a program library 2 is supplied as code (either source code or compiled code) carried by a storage medium 4 (such as an optical CD ROM, semiconductor ROM, or magnetic recording medium, etc.) or by a signal 6 (for example an electrical or optical signal transmitted over a communication network such as the Internet or through the atmosphere) to a game developer apparatus 8.

The game developer apparatus 8 is operated to use the programs contained in the program library 2 to generate software code defining an application product 10, which, in this embodiment, comprises a computer game which uses 3D computer graphics to interactively display images to a user.

The code defining the 3D graphics computer game 10 is supplied as compiled code on a storage medium 12 (such as an optical CD ROM, semiconductor ROM, or magnetic recording medium, etc.) or as compiled code carried by a signal 14 (for example an electrical or optical signal transmitted over a communication network such as the Internet or through the atmosphere) to a game platform 16. The software defining the 3D computer graphics game 10 may then be installed in, and run by, the game platform 16.

Referring again to FIG. 1, the program library 2 of the software development toolkit comprises software code defining a plurality of programs 20–30, each for causing a target type of programmable processing apparatus (that is, game developer apparatus 8 or game platform 16 in this embodiment) to perform a 3D computer graphics processing operation. The programs 20–30 in the software development toolkit are generated by one or more users writing program code, with the programs then being collected together to generate the program library 2.

In this embodiment, the programs in the program library 2 include a darkmap generation program 20, a gamma-correction program 22, a texel weighting value calculation program 24 and a darkmap rendering program 26.

Darkmap generation program 20 comprises code for programming game developer apparatus 8 to become operable to perform processing to convert a lightmap into a darkmap.

Gamma-correction program 22 comprises code for programming game developer apparatus 8 to become operable to perform processing to calculate gamma-corrected R, G, B values for texels in a texture map.

Texel weighting value calculation program 24 comprises code for programming game developer apparatus 8 to become operable to process the texel values of a texture map to calculate a respective weighting value for each texel and to store the respective weighting value for each pixel in the alpha channel associated with the pixel.

Darkmap rendering program 26 comprises code for programming game platform 16 to become operable to perform processing during rendering to render surface primitives with both a texture map and a darkmap. More particularly, darkmap rendering program 26 comprises code for programming game platform 16 to become operable to render surface primitives with texture map data to produce textured pixel values in a frame buffer together with texture map weighting values stored as alpha values in the frame store, and then to use scalar multiplication to generate darkmap values modulated by the alpha-channel texture map weighting values, and vector subtraction to subtract the modulated darkmap values from the textured pixel values.

Referring to FIG. 2, the game developer apparatus 8 comprises a conventional programmable processing apparatus, such as a personal computer (PC) or workstation. The game developer apparatus 8 contains, in a conventional manner, one or more processor, memories, graphics cards, sound cards etc., and has connected thereto a display device 40, such as a conventional PC monitor, and user input devices 42, such as a keyboard, mouse, etc.

The game developer apparatus 8 is programmable in accordance with programming instructions input to the apparatus for example as data stored on a data storage medium (such as an optical CD ROM, semiconductor ROM, or magnetic recording medium, etc.), and/or as a signal (for example an electrical or optical signal transmitted over a communication network such as the Internet or through the atmosphere) and/or entered by a user via a user input device 42 such as a keyboard. In this embodiment, the programming instructions input to game developer apparatus 8 include the programming instructions contained in the program library 2, which are input to game developer apparatus 8 as instructions carried by storage medium 4 and/or signal 6, as described above.

In this embodiment, texture maps and lightmaps are input to game developer apparatus 8 as data stored on a data storage medium 44 (such as optical CD ROM, semiconductor ROM or magnetic recording medium, etc.) and/or as a signal 46 (for example an electrical or optical signal transmitted over a communication network such as the Internet or through the atmosphere). Of course, in addition or instead, one or more texture maps or lightmaps may be generated by the user of game developer apparatus 8 by entering data via a user input device 42 such as a keyboard. In addition or instead, the program library 2 input to processing apparatus 8 may include one or more texture maps and/or lightmaps.

Each texture map may comprise image data recorded by a camera, synthetic data generated for example by an artist, or other forms of data. Combinations of these different data types are, of course, possible with any one texture map.

When programmed by the programming instructions, game developer apparatus 8 can be thought of as being configured as a number of data stores and functional units for performing processing operations. Examples of relevant functional units and data stores together with their interconnections are shown in FIG. 2. The processing units, data stores and interconnections illustrated in FIG. 2 are, however, notional, and are shown for illustration purposes only to assist understanding; they do not necessarily represent the actual processing units, data stores and interconnections into which the processor, memory, etc. of game developer apparatus 8 become configured.

The processing unit and data stores schematically illustrated in FIG. 2 will now be described.

Darkmap generator 50 comprises one or more processors operating in accordance with the darkmap generation program 20 from the program library 2. The darkmap generator 50 is operable to process lightmaps to convert them into darkmaps.

Gamma-correction value calculator 52 comprises one or more processors operating in accordance with the gamma-correction program 22 from the program library 2. The gamma-correction value calculator 52 is operable to calculate gamma-corrected R, G and B values for the texels in texture maps.

Texel weighting value calculator 54 comprises one or more processors operating in accordance with the texel weighting value calculation program 24 from program library 2. Texel weighting value calculator 54 is operable to calculate a respective weighting value for each texel in a texture map and to store the value as an alpha value for the texel for subsequent use when the texture map is rendered on to a surface primitive together with a darkmap.

Program library store 56 comprises memory configured to store the program library 2 received from storage medium 4 and/or signal 6.

Texture map store 58 comprises memory configured to store texture map data received from storage medium 44 and/or signal 46.

Lightmap store 60 comprises memory configured to store lightmap data received from storage medium 44 and/or signal 46.

Darkmap store 62 comprises memory configured to store data defining darkmaps generated by darkmap generator 50.

Weighted texture map store 64 comprises memory configured to store texture map data comprising gamma-corrected R, G and B values generated by gamma-correction value calculator 52 together with a weighting value for each texel calculated by texel weighting value calculator 54, the weighting value for each texel being stored in the corresponding alpha channel for the texel.

In use, the user of game developer apparatus 8 generates software code defining application product 10 (which, in this embodiment, comprises a computer game which uses 3D computer graphics to interactively display images to a user).

The application product 10 contains code 70 comprising software instructions written by the user of game developer apparatus 8 defining instructions for controlling game platform 16 to play the computer game in accordance with user inputs. The software instructions 70 include calls to programs included in the program library 2, so that the code defining each program in the program library 2 called by the programming instructions 70 becomes part of the code defining the application product 10 when it is compiled.

The software instructions 70 also reference darkmaps generated and stored in darkmap store 62 and gamma-corrected and weighted texture maps generating stored and weighted texture map store, which also become part of the code defining the application product 10 when it is compiled.

Consequently, when the application product is compiled into machine code instructions, the application product 10 comprises the instructions 70 generated by the user of game developer apparatus 8, programs 72 including programs from the program library 2, including the darkmap rendering program 26, and data records 74, including a plurality of darkmaps 76 and a plurality of gamma-corrected texture maps 78 having calculated weighting values stored in the alpha channels. Other programs 72 included in the application product 10 in this embodiment include, in a conventional manner for 3D computer graphics games, control programs, rendering programs, lighting programs, etc. Other data records 74 included in the application product 10 in this embodiment include, in a conventional manner for 3D computer graphics games, data defining polygon models representing 3D objects and scenes, data defining properties of materials associated with the polygons, data defining cameras to view the 3D computer models and scenes, and data defining light sources to light the 3D computer models and scenes, etc.

The compiled machine code defining application product 10 is delivered to end users of game platforms 16 as code on a storage medium 12, and/or as a signal 14, as described above. The code defining application product 10 may be output by game developer apparatus 8 and stored directly on storage medium 12. Alternatively, the code defining application product 10 output from game developer apparatus 8 may be stored on a "master" storage medium and then further storage media 12 storing the code may be generated therefrom for delivery to the user of a game platform 16. In this way, an indirect recording is made of the code defining application product 10 from game developer apparatus 8 for delivery to the user of a game platform 16. Similarly, the signal 14 carrying the code defining application product 10 to game platform 16 may be the direct output of game developer apparatus 8 or a signal generated indirectly therefrom.

Referring to FIG. 3, game platform 16 comprises, in a conventional manner, one or more processors, memories, graphics cards, sound cards, together with prestored programming instructions for the control of the processors, etc., and has connected thereto one or more user input devices 90 for inputting user instructions to play the game (such as a control pad, joystick, etc.) and a display device 92 (such as a conventional PC monitor, etc.).

The hardware and prestored programming instructions provided in game platform 16 during manufacture configure the game platform 16 to define, inter alia, a game code store 100, a pixel buffer 102 and a scalar multiplication and vector subtraction unit 104.

Game code store 100 comprises memory configured to store game code input to game platform 16 from storage medium 12 and/or signal 14.

Pixel buffer 102 comprises a Z-buffer (or depth-buffer) 104 controlled in accordance with a conventional Z-buffer algorithm, and a frame buffer 106 configured to store, for each pixel, R, G and B values together with an associated alpha value.

Scalar multiplication and vector subtraction unit 104 is operable to multiply the R, G and B values of an input darkmap element with the alpha value stored in the frame buffer 106 for the corresponding pixel using scalar multiplication such that, if σ is the value stored in the alpha channel, then the scalar multiplication σ (R, G, B) gives σR, σG, σB. The scalar multiplication and vector subtraction unit 104 is further operable to subtract the resulting modulated R, G and B darkmap values (that is, σR, σG, σB) from the R, G and B values for the pixel already stored in the frame buffer 106 using vector subtraction to give R−σR, G−σG, B−σB.

Game platform 16 is programmed to operate in accordance with the game code input from storage medium 12 and/or signal 14.

When programmed by the game code programming instructions, game platform 16 can be thought of as being configured as a number of functional processing units and data stores other than those defined by the hardware and prestored programming instructions provided in game platform 16 during manufacture. Examples of relevant functional processing units and data stores are schematically illustrated in FIG. 3. The processing units, data stores and interconnections illustrated in FIG. 3 are, however, notional and are shown for illustration purposes only to assist understanding; they do not necessarily represent the actual processing units, data stores and interconnections into which the processors, memories, etc. of the game platform 16 become configured.

More particularly, when programmed by the game code, game platform 16 may be thought of as including a weighted texture map store 108, a darkmap store 110, a texture rendering pipeline 112, and a darkmap renderer 114.

Weighted texture map store 108 comprises memory configured to store data defining gamma-corrected R, G, B texel values of each texture map together with a weighting value stored in the alpha channel for each texel (these values corresponding to the gamma-corrected texel values and weighting values previously calculated in game developer apparatus 8 and input to game platform 16 as part of the game code on storage medium 12 and/or signal 14).

Darkmap store 110 comprises memory configured to store darkmaps previously generated by game developer apparatus 8 and input to game platform 16 as part of the game code on storage medium 12 and/or signal 14.

Texture rendering pipeline 112 comprises one or more processors operable in accordance with programming instructions from the game code input to game platform 16 on storage medium 12 and/or signal 14 to render 3D computer models to generate 2D views thereof, the rendering including processing to texture map surface primitives from the 3D computer models with the gamma-corrected R, G, B texel values of texture maps stored in the weighted texture map store 108.

Darkmap renderer 114 comprises one or more processors operating in accordance with the darkmap rendering program 26 input to game platform 16 as part of the game code on storage medium 12 and/or signal 14.

Figure 4:
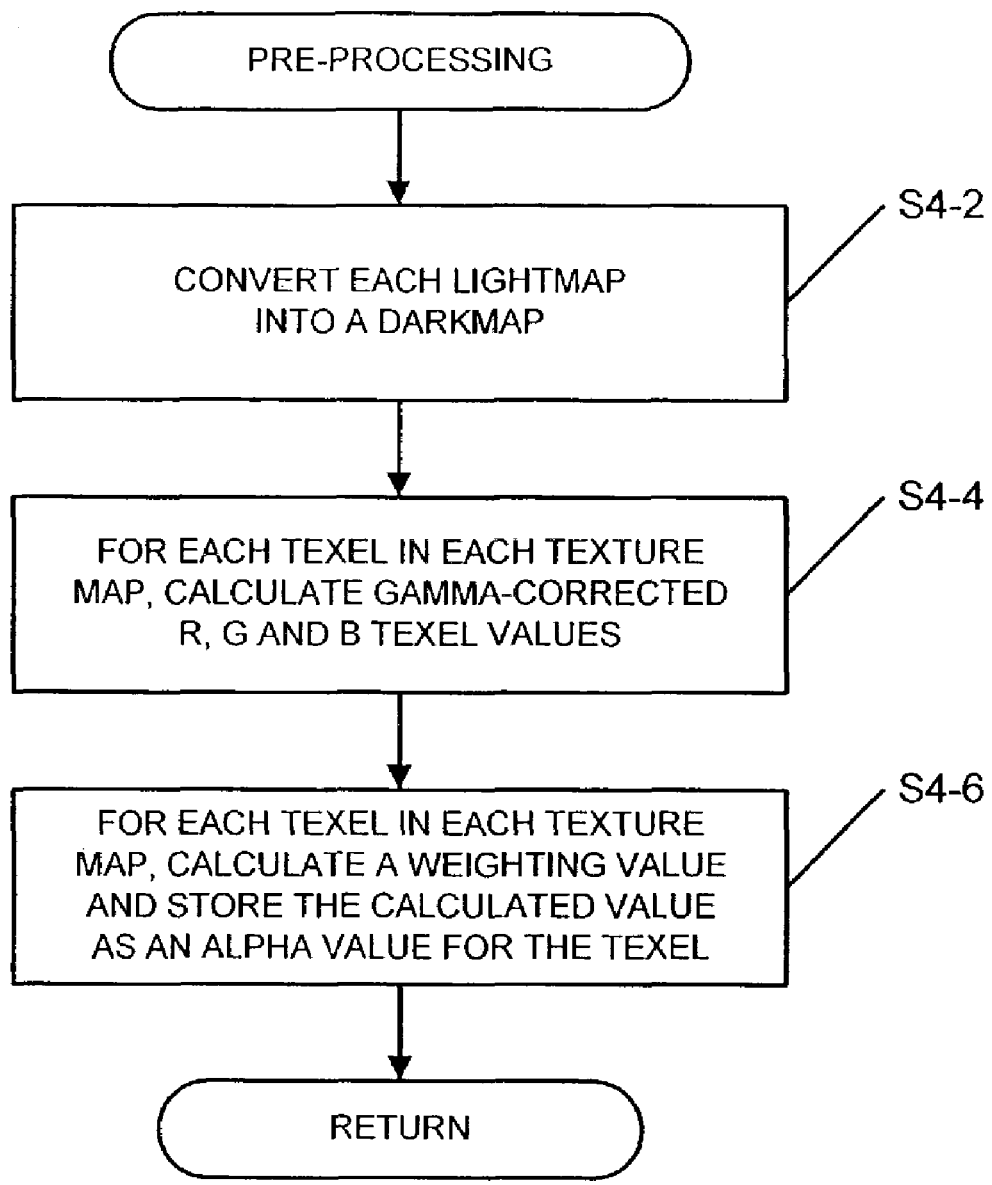
FIG. 4 shows the processing operations performed by either the game developer apparatus of FIG. 2 or the game platform of FIG. 3 prior to performing processing to play the game.

Referring now to FIG. 4, the processing operations performed by the functional processing units in game developer apparatus 8 to generate darkmaps and texture maps which are then included in the game code 10 will be described.

At step S4-2, darkmap generator 50 converts each lightmap into a darkmap for inclusion in the game code 10.

More particularly, to convert a lightmap into a darkmap, darkmap generator 50 processes each lumel of the darkmap to normalise the R, G and B values thereof to lie in the range 0 to 1, and then subtracts the resulting normalised R, G and B values from 1 to give respective R, G and B values for the corresponding element in the darkmap. In addition, darkmap generator 50 sets the value in the alpha channel of the darkmap element to be zero. Thus, the values for each darkmap element are calculated in accordance with the following equations:

$$D_r = 1 - L_r \tag{1}$$

$$D_g = 1 - L_g \tag{2}$$

$$D_b = 1 - L_b \tag{3}$$

$$D_a = 0 \tag{4}$$

where:

$L_r$, $L_g$ and $L_b$ are the respective red, green and blue values of a lumel in the lightmap; and $D_r$, $D_g$ and $D_b$ are the normalised red, green and blue values calculated for the corresponding element of the darkmap, and $D_a$ is the value set in the alpha channel for the darkmap element.

At step S4-4, gamma-correction value calculator 52 processes each texel in each texture map to calculate gamma-corrected red, green and blue texel values in accordance with the following conventional equations:

$$B_r = T_r^{1/\gamma} \tag{5}$$

$$B_g = T_g^{1/\gamma} \tag{6}$$

$$B_b = T_b^{1/\gamma} \tag{7}$$

where:

$B_r$, $B_g$ and $B_b$ are the respective, red, green and blue gamma-corrected values for a texel in a texture map;

$T_r$, $T_g$ and $T_b$ are the respective red, green and blue values of the texel in the initial (uncorrected) texture map; and γ is a value representing the gamma-response of the display device on which images using the texture maps are to be displayed (that is, display device 92 of game platform 16 in this embodiment).

At step S4-6, texel weighting value calculator 54 calculates a respective texel weighting value for each texel in a given texture map and stores the calculated value as an alpha value in the alpha channel for the texel.

More particularly, texel weighting value calculator 54 calculates each texel weighting value as a weighted combination of the texel's R, G and B values. In this embodiment, the weighted combination is calculated in accordance with the following equation:

where:

$$\sigma = \frac{(W_r \times B_r^2) + (W_g \times B_g^2) + (W_b \times B_b^2)}{(W_r \times B_r) + (W_g + B_g) + (W_b \times B_b)} \quad (8)$$

σ is the weighting value for a texel;

$B_r$, $B_g$ and $B_b$ are the respective red, green and blue values of the texel (which, in this embodiment, are the gamma-corrected values, although the uncorrected values could be used instead); and $W_r$, $W_g$ and $W_b$ are respective non-zero weighting constants for the red, green and blue texel values. Since $W_r$, $W_g$ and $W_b$ are non-zero each of the texel R, G and B values will contribute to the weighting value σ (unless, of course, the R, G or B value is itself zero).

In this embodiment, the weighting constant $W_r$, $W_g$ and $W_b$ are assigned the following values, although different values could be assigned instead:

$$W_r = 0.299 \quad (9)$$

$$W_g = 0.587 \quad (10)$$

$$W_b = 0.114 \quad (11)$$

These values are from the CIE (Commission Internationals de l'Eclairage) 1931 formula for luminance "Y" (see, for example, "Computer Graphics Principles and Practice" by Foley, van Dam, Feiner and Hughes, Addison-Wesley Publishing Company, ISBN 0201848406, Section 13.3.3). The values 0.299, 0.587 and 0.114 represent the relative contribution of the red, green and blue colour components to an object's luminance or brightness when viewed by the human eye.

For all texel colours other than black, the denominator in Equation (8) is greater than zero and σ is well defined. For a black texel, the denominator in equation (8) becomes zero, and accordingly, in this embodiment, σ is defined to be zero for any black texel.

As a result of performing the processing described above, game developer apparatus 8 stores in weighted texture map store 64 a plurality of texture maps, each texture map comprising a plurality of texels, and each texel having associated therewith four values, namely gamma-corrected R, G and B values and a texel weighting value stored in the alpha channel for the texel. As explained above, the texture maps stored in weighted texture map store 64 subsequently form part of the game code 10 which is exported to, and run by, game platform 16.

By calculating the respective texel weighting value σ for each texel as described above, the texel weighting value has properties which result in a realistic looking image being generated when rendering is performed by subtracting from the texel values darkmap values weighted by the texel weighting values. This is the case irrespective of the R, G and B texel values and irrespective of the R, G and B values of the darkmap elements from which the image is generated.

More particularly, it can be shown (for example as set out in the Appendix at the end of this description) that texel weighting value σ will always have a value which lies between the maximum of the R, G and B values of σ texel (that is, the largest of the R, G and B values) and the minimum of the R, G and B values of the texel (that is, the smallest of the R, G and B values), such that:

$$\min(B_r, B_g, B_b) \leq \sigma \leq \max(B_r, B_g, B_b) \quad (12)$$

where the terms in equation (12) have the same meaning as defined above.

Because the texel weighting value is less than or equal to the largest R, G, B value, it provides a measure of the amount of light which can be subtracted from each colour component of a pixel in the frame buffer whilst keeping the maximum R, G, B value of the pixel non-negative.

In addition, because the texel weighting value is greater than or equal to the smallest R, G, B value, it provides a measure of the light which can be subtracted from each colour component of a pixel in the frame buffer whilst ensuring that the smallest R, G, B value of the pixel becomes saturated to zero.

Thus, during rendering with high darkmap values, only the largest R, G, B value of a pixel will be able to survive, but then the final colour displayed to the user should be close to black anyway.

For smaller darkmap values during rendering, less light is subtracted from pixels in the frame buffer allowing smaller colour component values more scope to survive the subtraction and hence maintain proper hue; this is important because the final colour displayed to the user may have significant luminance.

A further property of each texel weighting value when calculated as described above is that the value is equal to the smallest of the R, G, B values of the texel when the colour of the texel is monochromatic or an unsaturated colour (that is, white, black or grey). In other words, as shown in the Appendix at the end of this description:

For any colour of the form:

$$[B_r, B_g, B_b] = [U \text{ or } 0, U \text{ or } 0, U \text{ or } 0] \text{ where } U = \max(B_r, B_g, B_b) \quad (13)$$

then $$\sigma = U = \max(B_r, B_g, B_b) \quad (14)$$

Considering now a conventional R, G, B cube (that is, a cube defined in three-dimensional space by an R axis, a G axis and a B axis, along which the values vary between 0 and 1, for example as described in Section 13.3.1 of "Computer Graphics Principles and Practice" by Foley, van Dam, Feiner and Hughes, Addison-Wesley Publishing Company, ISBN 0201848406), each texel weighting value will be equal to the largest of the R, G and B values of the texel as set out in equation (14) above when the R, G, B values of the texel define a point along any line which connects a corner of the cube to the origin (0, 0, 0) of the cube, that is, the lines comprising:

the respective R, G and B axes of the cube;

the leading diagonal of any face which passes through the origin of the R, G, B cube, that is the line in the plane of the face which passes through the origin and the opposite corner of the face; and the monochrome leading diagonal through the R, G, B cube, that is the diagonal from the origin (0, 0, 0) to the corner (1, 1, 1).

Elsewhere in the R, G, B cube, the texel weighting value will dip below the value of the largest R, G and B value of the texel in a way which is weighted by the R, G, B weighting constraints $W_r$, $W_g$ and $W_b$ in equation (8), such that:

the texel weighting value will become lower when the blue value of the texel dominates;

the texel weighting value will become higher when the green value of the texel dominates; and the texel weighting value will become middling when the red value of the texel dominates.

This is exemplified in the following table, which shows values of the texel weighting value for example selections of red, green and blue texel values:

| $B_r$ | $B_g$ | $B_b$ | $\sigma$ |
|---|---|---|---|
| 0.8 | 0.2 | 0.2 | 0.578 |
| 0.2 | 0.8 | 0.2 | 0.710 |
| 0.2 | 0.2 | 0.8 | 0.404 |

When the blue component of the texel dominates the colour, the texel weighting value has a relatively small value. This allows the green and red components, to which the eye is more sensitive, more scope to survive the subtraction when the darkmap is subtracted. This applies even with large darkmap values, and hence allows blues with hints of cyan or magenta to maintain hue. This can leave an excess in the blue component compared to standard lightmapping techniques in which a lightmap is combined with rendered texture map values in the frame buffer using vector multiplication. However, the final luminance value is less susceptible to such an excess since the eye is least sensitive to blue.

When the green component of the texel dominates the colour, the texel weighting value has a relatively high value. This tends to eliminate any red or blue component when the darkmap is subtracted even for smaller darkmap values. However, since the eye is not sensitive to these components anyway, the apparent hue tends to be maintained as green.

When the red component of the texel dominates the colour, the texel weighting value has a middling value. This tends to eliminate any green or blue components when large darkmap values are subtracted (where the colour displayed to the user should be close to black anyway) but allows the green component, to which the eye is more sensitive, more scope to survive the darkmap subtraction with smaller darkmap values. This tends to maintain the hue of illuminated reds with hints of yellow which are not darkened right down to black.

Figure 5:
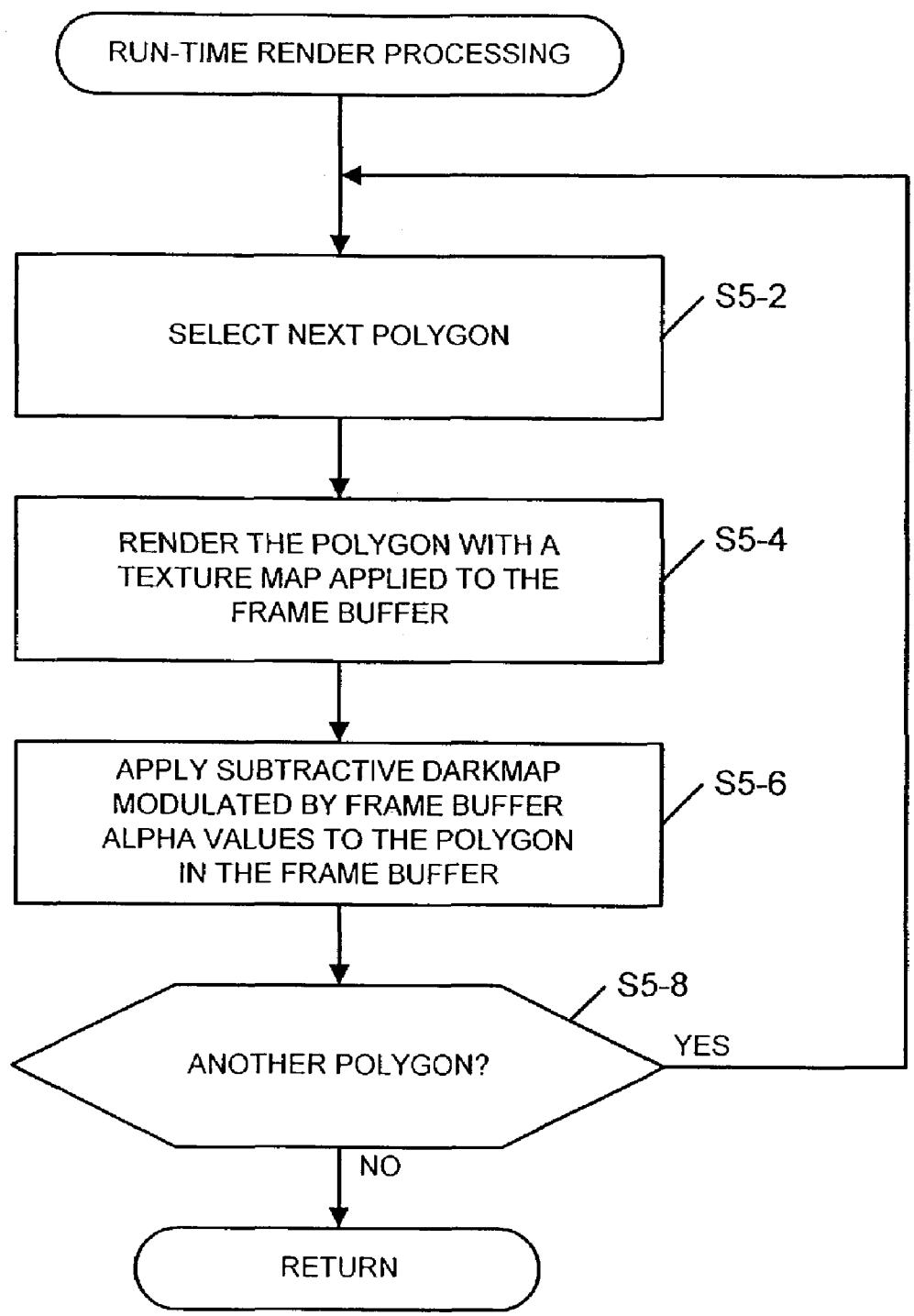
FIG. 5 shows the processing operations performed by the game platform of FIG. 3 during processing to play a game to render a polygon with both a texture map and a darkmap.

Referring now to FIG. 5, the processing operations performed in this embodiment by game platform 16 when the game code 10 supplied to the platform is run and polygons are rendered with texture maps and darkmaps, will now be described.

At steps S5-2 and S5-4, the next polygon is selected for rendering (this being the first polygon first time step S5-2 is performed) and the polygon is processed by the elements making up the texture rendering pipeline 112 to render the polygon to the frame buffer 106 with texture data applied from a texture map stored in weighted texture map store 108 in a conventional way. This rendering is performed using a Z-buffer algorithm to write the pixel values in the frame buffer 106. Consequently, after step S5-4 has been performed for a given polygon, pixel values comprising rendered texture map values are stored in frame buffer 106, together with a respective texel weighting value for each pixel, which is stored as an alpha value in the corresponding alpha channel for the pixel. In addition, a depth value is stored for each pixel in the Z-buffer 104 defining the depth of the polygon occupying the pixel from the viewing camera in a conventional way.

At step S5-6, darkmap renderer 114 controls scalar multiplication and vector subtraction unit 104 to generate weighted darkmap values and to subtract the weighted darkmap values from the pixel values previously stored in the frame buffer 106 at step S5-4.

More particularly, darkmap renderer 114 controls scalar multiplication and vector subtraction unit 104 to perform processing for each pixel rendered into the frame buffer 106 at step S54 such that the texel weighting value for the pixel is read from the alpha channel, the respective R, G and B values of the corresponding darkmap element for the pixel are multiplied by the texel weighting value, and the resulting weighted R, G and B values are subtracted from the pixel R, G and B values previously stored in the frame buffer 106 at step S5-4. In this way, each pixel stored in the frame buffer 106 after step S5-6 has been performed comprises R, G, B texture map values from which have been subtracted darkmap R, G, B values weighted by the previously calculated texel weighting value of the corresponding texel in the texture map.

As a result of performing the processing at steps S5-4 and S5-6, the resulting colour values stored in the frame buffer 106 for each rendered pixel are given by the following equation:

$$DST_{col} \leftarrow B_{col} \theta [\sigma \times DARKMAP_{col}] \qquad (15)$$

where $DST_{col}$ are the R, G, B colour values of the pixel stored in frame buffer 106 as a result of steps S5-4 and S5-6;

$B_{col}$ are the gamma-corrected R, G, B colour values of the texel from a texture map stored in weighted texture map store 108 which is rendered onto the polygon which projects to the pixel;

$\sigma$ is the texel weighting value stored as an alpha value in the weighted texture map store 108 for the rendered texel;

$DARKMAP_{col}$ are the R, G, B colour values of a darkmap element stored in darkmap store 110 which is rendered onto the polygon which projects to the pixel;

"×" denotes scalar multiplication of the $\sigma$ value with each of the respective R, G, B values of the darkmap element;

$\theta$ denotes saturating vector subtraction, such that:

$$[X_r, X_g, X_b] \theta [Y_r, Y_g, Y_b] = [\max (X_r - Y_r, 0), \max (X_g - Y_g, 0), \max (X_b - Y_b, 0)]$$

such that all resulting values are greater than or equal to zero.

At step S5-8, texture rendering pipeline 112 determines whether any polygons remain to be rendered, and steps S5-2 to S5-8 are repeated until all polygons have been rendered in the way described above, thereby generating pixel data in frame buffer 106 defining an image for display to the user on display device 92.

As a result of performing rendering as described above, the pixel values, stored in frame buffer 106 define a realistic-looking image for display to the user on display 92 irrespective of the starting values of the texels of the texture map stored in weighted texture map store 108 and irrespective of the starting darkmap element values of the darkmap stored in darkmap store 110.

As discussed above, for any texel colour of the form:

$$[B_r, B_g, B_b] = [U \text{ or } 0, U \text{ or } 0, U \text{ or } 0] \text{ where } U = \max(B_r, B_g, B_b)$$

then $$\sigma = U = \max(B_r, B_g, B_b)$$

and so $$B_{col} \ominus [\sigma \times DARKMAP_{col}] = [U \text{ or } 0, U \text{ or } 0, U \text{ or } 0] \ominus U \times \quad (16)$$
$$[1 - L_r, 1 - L_g, 1 - L_b]$$

$$= [U \times L_r \text{ or } 0, \quad\quad\quad\quad\quad\quad (17)$$
$$U \times L_g \text{ or } 0, U \times L_b \text{ or } 0]$$

$$= [B_r, B_g, B_b] \otimes [L_r, L_g, L_b] \quad\quad (18)$$

where denotes vector-modulating multiplication, and the other symbols have the same definitions as set out previously.

Consequently, the scalar multiplication and vector subtraction of the darkmap colour values performed at step S5-6 yields the same result as conventional vector multiplication with lightmaps when $[B_r, B_g, B_b] = [U \text{ or } 0, U \text{ or } 0, U \text{ or } 0]$.

In other words, the scalar multiplication and vector subtraction of darkmaps at S5-6 generates the same result as the vector multiplication of lightmaps when the R, G and B texel values define a point along any line which connects the origin (0, 0, 0) of a conventional R, G, B cube with one of the corners of the cube, these lines being (as described above):

the respective R, G and B axes of the cube;
the leading diagonal of any face which passes through the origin of the R, G, B cube, that is the line in the plane of the face which passes through the origin and the opposite corner of the face; and
the monochrome leading diagonal through the R, G, B cube, that is the diagonal from the origin (0, 0, 0) to the corner (1, 1, 1).

For texel R, G, B values which define points elsewhere in the R, G, B cube, the value of the texel weighting value dips below the largest of the R, G and B texel values in a manner weighted by the R, G, B weighting constants $W_r$, $W_g$, $W_b$ in equation (8) described above (these being the CIE luminance weights in this embodiment). As a result, by performing rendering as described above, the subtraction of a darkmap values from rendered texture map values darkens the texture map values by an amount dependent upon the texel values, so that the texture hue is converted into a final lit colour for display.

By way of example, consider a lumel in a lightmap with a cyan-ish colour [0.3, 0.7, 0.7]. The processing at step S4-2, therefore generates a darkmap element with colour [0.7, 0.3, 0.3].

Consider firstly the application of this lightmap/darkmap element to a texel of blue-ish colour [0.2, 0.2, 0.8] for which the texel weighting value calculated at step S4-6 is 0.404, and secondly to a texel of green-ish colour [0.2, 0.8, 0.2] for which the texel weighting value calculated at step S4-6 is 0.710.

In the case of the blue-ish texel [0.2, 0.2, 0.8], then the conventional combination of the texel with the lightmap lumel [0.3, 0.7, 0.7] using vector multiplication gives:

$$[0.2, 0.2, 0.8] \times [0.3, 0.7, 0.7] = [0.06, 0.14, 0.56] \text{ with luminance } Y = 0.164 \quad (19)$$

On the other hand, the combination of the texel with the darkmap element [0.7, 0.3, 0.3] using scalar multiplication and vector subtraction as described above at step S5-6 gives:

$$[0.2, 0.2, 0.8] \ominus 0.404 \times [0.7, 0.3, 0.3] = [0, 0.079, 0.679] \text{ with luminance } Y = 0.124 \quad (20)$$

In this example, the low texel weighting value for the darkmap multiplication and subtraction allows the green hue to survive in the resulting pixel, as it does in the standard vector multiplication technique. The red component is, however, destroyed in the darkmap method. The blue value remains noticeably larger in the darkmap method (because the texel weighting value allows scope for the green component to survive), although the eye is not very sensitive to blue.

In the case of the texel of green-ish colour [0.2, 0.8, 0.2] rendering using the lightmap and standard vector multiplication gives:

$$[0.2, 0.8, 0.2] \times [0.3, 0.7, 0.7] = [0.06, 0.56, 0.14] \text{ with luminance } Y = 0.363 \quad (21)$$

On the other hand, rendering using the darkmap and scalar multiplication and vector subtraction as described above at step S5-6 gives:

$$[0.2, 0.8, 0.2] \ominus 0.710 \times [0.7, 0.3, 0.3] = [0, 0.587, 0] \text{ with luminance } Y = 0.329 \quad (22)$$

In this case, the high texel weighting value destroys the red and blue components when the darkmap is applied using the scalar multiplication and vector subtraction method. These components are destroyed because the texel weighting value has to be sufficient to bring the value of the green component down sufficiently. The green value is just marginally larger in the darkmap method than in the lightmap method, although the luminance is a little less; a further reduction in green intensity would give a poorer luminance match.

Second Embodiment

A second embodiment of the invention will now be described.

In the first embodiment above, the processing to convert each lightmap into a darkmap at step S4-2, the processing to calculate gamma-corrected texel values at step S4-4, and the processing to calculate a texel weighting value for each texture map texel at step S4-6 is performed by game developer apparatus 8. Consequently, the compiled game code 10 contains data defining one or more darkmaps, and one or more texture maps having gamma-corrected texel values and texel weighting values stored as alpha values.

However, one or more of steps S4-2, S4-4 and S4-6 may be performed by game platform 16 instead of game developer apparatus 8.

More particularly, in the second embodiment, the contents of the program library 2 are the same as those described in the first embodiment, but the darkmap generator 50, gamma-correction value calculator 52 and texel weighting value calculator 54 no longer form part of the game developer apparatus 8 as in the first embodiment. Instead, the compiled game code 10 generated by game developer apparatus 8 includes code defining the darkmap generation program 20, the gamma-correction program 22, the weighting value calculation program 24, and the darkmap rendering program 26 from the program library 2. Consequently, the darkmap generator 50, gamma-correction value generator 52 and texel weighting value calculator 54 comprise part of the game platform 16 in the second embodiment. In addition, darkmap store 62 and weighted texture map store 64 are omitted from game developer apparatus 8, and game code 10 includes data defining lightmaps and non-gamma-corrected texture maps. Game platform 16 includes a texture map store 58 to store the uncorrected texture map data and a lightmap store 60 to store the lightmap data.

In the second embodiment, all of processing operations S4-2, S4-4 and S4-6 are performed by game platform 16 before processing is carried out in accordance with user instructions to play the game interactively. The processing operations at steps S4-2, S4-4 and S4-6 are performed in game platform 16 in the same way as described above.

Third Embodiment

A third embodiment of the invention will now be described.

In the first and second embodiments described above, the processing performed at step S4-6 by texel weighting value calculator 54 (whether as part of the game developer apparatus 8 in the first embodiment or as part of the game platform 16 in the second embodiment) comprises calculating each texel weighting value using equation (8) above.

However, in the third embodiment, texel weighting values are precalculated and prestored for respective representative R, G and B values, and the processing performed at step S4-6 by weighting value calculator 54 comprises a look-up of the stored texel weighting value for the R, G and B values which are closest to the R, G and B values of the texel for which the weighting value is being calculated.

More particularly, in the third embodiment, the program library 2 includes data defining the look-up tables 120–140 set out in FIGS. 6a to 6k.

The texel weighting value calculation program 24 in program library 2 comprises code for causing a programmable processing apparatus (that is, game developer apparatus 8 if texel weighting values are to be calculated in game developer apparatus 8 as in the first embodiment, or game platform 16 if texel weighting values are to be calculated in the game platform 16 as in the second embodiment) to perform a look-up operation using the look-up tables 120–140 to generate a texel weighting value for each texture map texel as will be described below. The other contents of the program library 2 are the same as those in the first embodiment or second embodiment described above.

If the processing at step S4-6 to calculate texel weighting values is to be performed by game developer apparatus 8 (as in the first embodiment), then the functional components of the game developer apparatus 8 are the same as those in the first embodiment, with the exception that an additional data store is provided, namely a data store to store the look-up tables 120–140 in FIGS. 6a to 6k. In this case, the contents of the compiled game code 10 and the contents and processing operations performed by game platform 16 are the same as those described above in the first embodiment.

On the other hand, if the processing at step S4-6 to calculate texel weighting values is to be performed in game platform 16, then compiled game code 10 includes code defining the texel weighting value calculation program 24 from the program library 2 and also data defining the look-up tables 120–140 shown in FIGS. 6a to 6k. Game platform 16 would include a texel weighting value calculator 54 (as in the second embodiment) operable to generate texel weighting values as described below, and also a data store to store the look-up tables 120–140.

Figure 7:
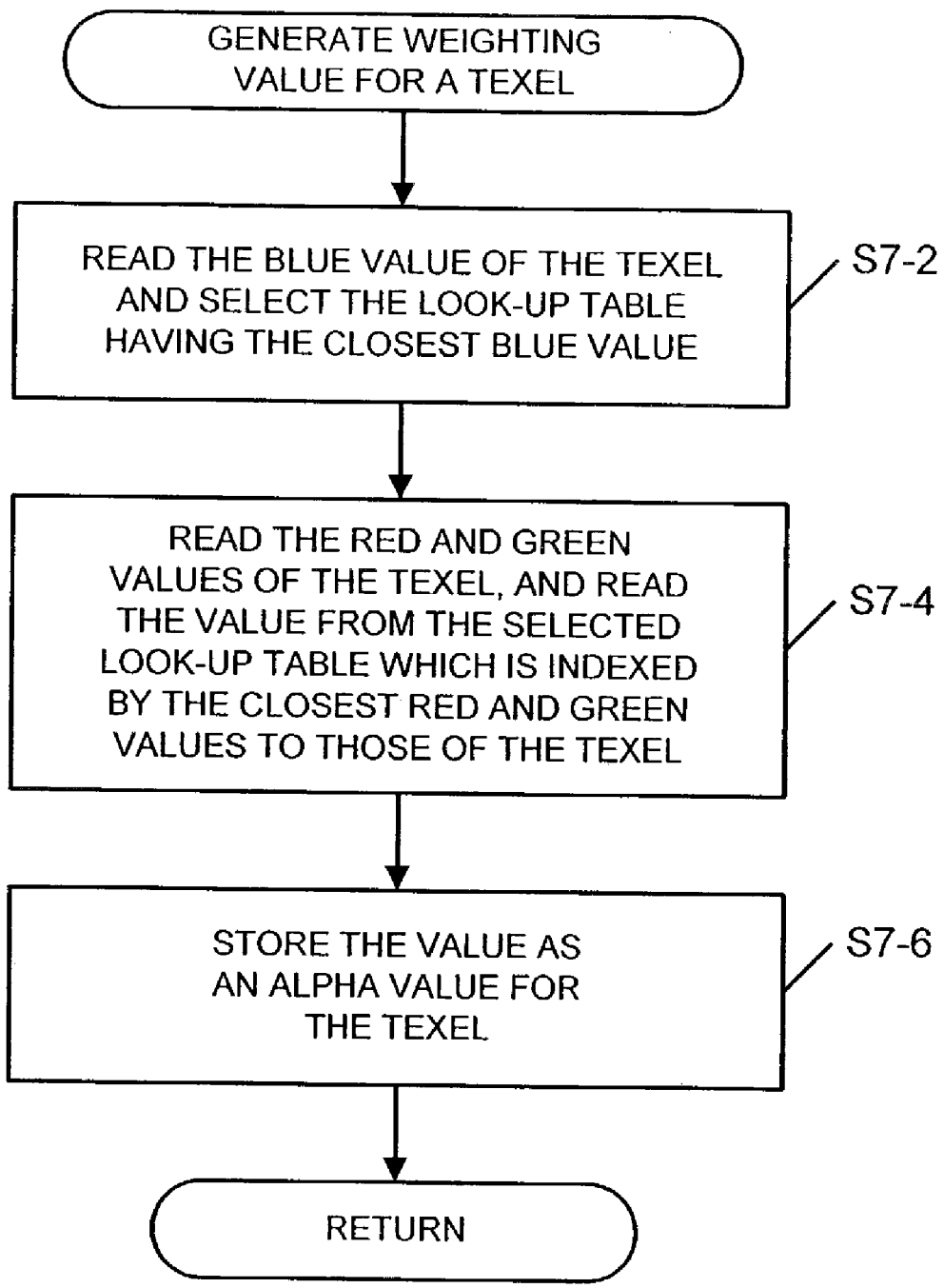
FIG. 7 shows the processing operations performed in a third embodiment by either the game developer apparatus of FIG. 2 or the game platform of FIG. 3 to generate a weighting value for a texel.

FIG. 7 shows the processing operation performed at step S4-6 by texel weighting value calculator 54 to generate a weighting value for a given texel, these processing operations being the same whether the texel weighting value calculator 54 is part of a game developer apparatus 8 (as in the first embodiment) or part of a game platform 16 (as in the second embodiment).

Referring to FIG. 7, at step S7-2, texel weighting value calculator 54 reads the blue value of the texel for which a texel weighting value is to be calculated, and selects the look-up table 120–140 which corresponds to the blue value closest to that of the read texel blue value.

Thus, for example, if the texel blue value is 0.62, then texel weighting value calculator 54 selects look-up table 132, whereas if the texel blue value is 0.08, then texel weighting value calculator 54 selects look-up table 122, etc.

At step S7-4, texel weighting value calculator 54 reads the red and green values of the texel being considered, identifies the red and green indices to the look-up table selected at step S7-2 which are closest to the texel red and green values, and reads the value from the look-up table defined by the identified indices.

Thus, for example, if the texel red value is 0.32 and the texel green value is 0.78, texel weighting value calculator 54 would identify a red index of 0.3 and a green index of 0.8. If look-up table 122 had been selected at step S7-2, texel weighting value calculator 54 would therefore read the value 0.707 from the look-up table as the texel weighting value for the texel.

At step S7-6, texel weighting value calculator 54 stores the value read from the look-up table at step S7-4 as an alpha value for the texel.

Modifications and Variations

Many modifications and variations can be made to the embodiments described above.

For example, in the first and second embodiments, each texel weighting value is calculated in accordance with equation (8) above. However, other equations may be used to calculate texel weighting values provided that the contribution of a texel's red, green and blue values are relatively weighted by the equation such that the green texel value is given more weight than the red texel value, the red texel value is given more weight than the blue texel value, and the respective weight applied to each of the red, green and blue texel values is non-zero.

In the third embodiment described above, each of the look-up tables 120–140 corresponds to a respective blue texel value, and the values within each look-up table 120–140 are indexed by red and green texel values. However, instead each look-up table 120–140 may correspond to a respective red texel value with the entries therein indexed by green and blue texel values, or each look-up table 120–140 may correspond to a respective green texel value, with the entries therein being indexed by red and blue texel values.

In the third embodiment described above, to select a pre-stored texel weighting value for a texel, the R, G and B look-up table index values closest to the R, G and B values of the texel are used to read the pre-stored value from the look-up table, and the read value is then stored for the texel. However, a more accurate final texel weighting value may be derived and stored for a texel by using one or more values read from the look-up tables. For example, two texel weighting values may be read from a look-up table for one or more colour components and the final texel weighting value may be derived by interpolating between the read values. For example, for a texel having R, G and B values 0.32, 0.78, 0.08, R and B look-up table index values of R=0.3 and B=0.1 may be selected (these being the closest R and B index values to the R and B texel values), while two look-up table index values may be selected for the green colour component, that is, the index values above and below the texel value, namely R=0.7 and R=0.8. In this example, the texel weighting values 0.617 and 0.707 would then be read from the look-up table 122. The final texel value for the texel could then be calculated by interpolating between the two values 0.617 and 0.707. For example, using linear interpolation the final texel value would be given by 0.617+0.8 (0.707−0.617), that is 0.689.

In all of the embodiments described above, each texture map texel has red, green and blue colour component values, and each texel weighting value is calculated by combining the red, green and blue colour component values weighted by the weighting constants $W_r$, $W_g$ and $W_b$. However, the present invention is not limited to texels with red, green and blue colour components. Instead, the present invention is also applicable to texels having colour components in accordance with other colour component models, such as cyan, magenta and yellow colour components.

In all of the embodiments described above, darkmap generator 50, gamma correction value calculator 52, texel weighting value calculator 54, and darkmap renderer 114 comprise one or more processors operating in accordance with programming instructions. However, one or more of these functional units may instead comprise hardware configured to perform the processing operations.

Other modifications are, of course, possible.

APPENDIX

1. Weighting Value σ will always lie between the largest and smallest of the R, G and B values of a texel Consider the largest R, G, B value $U = \max(B_r, B_g, B_b)$. Then:

$$B_r \leq U, B_g \leq U, B_b \leq U \Rightarrow \begin{cases} 0.299 \times B_r^2 \leq 0.299 \times B_r \times U \\ 0.587 \times B_g^2 \leq 0.587 \times B_g \times U \\ 0.114 \times B_b^2 \leq 0.114 \times B_b \times U \end{cases}$$

$$\Rightarrow 0.299 \times B_r^2 + 0.587 \times B_g^2 + 0.114 \times B_b^2$$
$$\leq (0.299 \times B_r \times U) + (0.587 \times B_g \times U) + (0.114 \times B_b \times U)$$
$$\Rightarrow 0.299 \times B_r^2 + 0.587 \times B_g^2 + 0.114 \times B_b^2 \leq Y \times U$$
$$\Rightarrow \sigma = \frac{0.299 \times B_r^2 + 0.587 \times B_g^2 + 0.114 \times B_b^2}{Y} \leq U$$

Consider also the smallest R, G, B value $L = \min(B_r, B_g, B_b)$. Then:

$$B_r \geq L, B_g \geq L, B_b \leq L \Rightarrow \begin{cases} 0.299 \times B_r^2 \geq 0.299 \times B_r \times L \\ 0.587 \times B_g^2 \geq 0.587 \times B_g \times L \\ 0.114 \times B_b^2 \geq 0.114 \times B_b \times L \end{cases}$$

$$\Rightarrow 0.299 \times B_r^2 + 0.587 \times B_g^2 + 0.114 \times B_b^2$$
$$\geq (0.299 \times B_r \times L) + (0.587 \times B_g \times L) + (0.114 \times B_b \times L)$$
$$\Rightarrow 0.299 \times B_r^2 + 0.587 \times B_g^2 + 0.114 \times B_b^2 \geq Y \times L$$
$$\Rightarrow \sigma = \frac{0.299 \times B_r^2 + 0.587 \times B_g^2 + 0.114 \times B_b^2}{Y} \geq L$$

Therefore
$$\min(B_r, B_g, B_b) \leq \sigma \leq \max(B_r, B_g, B_b)$$

2. For a monochromatic/unsaturated texel colour, the weighting value σ is equal to the largest of the R, G and B values $$[B_r, B_g, B_b] = [U, U, U] \Rightarrow \sigma =$$
$$\frac{0.299 \times U^2 + 0.587 \times U^2 + 0.114 \times U^2}{0.299 \times U + 0.587 \times U + 0.114 \times U} = \frac{U^2}{U} = U = \max(B_r, B_g, B_b)$$

This also holds for a texel in the texture map with one zero component and two other equal components. For example, for a yellow colour:

$$[B_r, B_g, B_b] = [U, U, 0] \Rightarrow \sigma =$$
$$\frac{0.299 \times U^2 + 0.587 \times U^2}{0.299 \times U + 0.587 \times U} = \frac{0.886}{0.886} \frac{U^2}{U} = U = \max(B_r, B_g, B_b)$$

This also holds for a texel in the texture map with two zero components. For example, for a red colour:

$$[B_r, B_g, B_b] = [U, 0, 0] \Rightarrow \sigma = \frac{0.299 \times U^2}{0.299 \times U} = \frac{0.299 \, U^2}{0.299 \, U} = U = \max(B_r, B_g, B_b)$$

So for any colour of the form $[B_r, B_g, B_b] = [U \text{ or } 0, U \text{ or } 0, U \text{ or } 0]$ where $U = \max(B_r, B_g, B_b)$ then $\sigma = U = \max(B_r, B_g, B_b)$

The invention claimed is:

1. A method, performed in a processing apparatus, of processing data defining a texture map comprising a plurality of texels each having an associated colour vector comprising a plurality of colour component values, to calculate weighting values for use in rendering with the texture map and a darkmap representing an inverse of a lightmap comprising an array of vectors, wherein each vector represents illumination at an image location associated with that vector, the method comprising for each respective one of at least some of the texels:

combining each of the colour component values of the texel's associated colour vector to give a scalar texel weighting value for the texel, the combination being carried out such that the contribution of each colour component value of the vector is dependent upon a respective non-zero colour component weighting value;

storing the calculated scalar texel weighting value for the texel with the data defining the texture map for subsequent use to modify the colour component values of a darkmap element when rendering is performed using the texel and the darkmap element; and displaying a pixel rendered using the texel and the darkmap element.

2. A method according to claim 1, wherein each scalar texel weighting value is calculated by combining the colour component values of the texel using colour component weighting values having relative values dependent upon the relative contribution of each colour component to brightness as perceived by a human viewer.

3. A method according to claim 1, wherein the colour component weighting values are values such that every scalar texel weighting value calculated using the colour component weighting values is a value which is greater than or equal to the smallest colour component value of the texel.

4. A method according to claim 1, wherein the colour component weighting values are values such that every scalar texel weighting value calculated using the colour component weighting values is a value which is less than or equal to the largest colour component value of the texel.

5. A method according to claim 1, wherein each colour component weighting value is a value less than one, and wherein the sum of the colour component weighting values is equal to one.

6. A method according to claim 1, wherein each texel has red, green and blue colour component values, and wherein the colour component weighting value for the green colour component is greater than the colour component weighting value for the red colour component, and the colour component weighting value for the red colour component is greater than the colour component weighting value for the blue colour component.

7. A method according to claim 6, wherein the colour component weighting values for the green, red and blue colour components are substantially 0.587, 0.299 and 0.114, respectively.

8. A method according to claim 7, wherein each scalar texel weighting value, $\sigma$, is calculated in accordance with the following formula, where R, G and B are the red, green and blue colour component values of the texel, respectively:

$$\sigma = \frac{0.299R^2 + 0.587G^2 + 0.114B^2}{0.299R + 0.587G + 0.114B}.$$

9. A method, performed in a processing apparatus, of processing data defining a texture map comprising a plurality of texels each having an associated colour vector comprising a plurality of colour component values, to generate scalar texel weighting values for use in rendering with the texture map and a darkmap representing an inverse of a lightmap comprising an array of vectors, wherein each vector represents illumination at an image location associated with that vector, the method comprising for each respective one of at least some of the texels:

reading the respective colour component values of the texel's associated colour vector;

selecting at least one scalar texel weighting value from a plurality of stored scalar texel weighting values in dependence upon all of the read colour component values of the texel's associated colour vector;

storing a scalar texel weighting value for the texel using the selected scalar texel weighting value(s) with the data defining the texture map for subsequent use to modify the colour component values of a darkmap element when rendering is performed using the texel and the darkmap element, wherein each stored texel weighting value comprises the combination of a plurality of colour component values, comprising one for each of the texel colour components, such that the contribution of each colour component value is dependent upon a respective non-zero colour component weighting value; and displaying a pixel rendered using the texel and the darkmap element.

10. A method according to claim 9, wherein the scalar texel weighting value selected from the plurality of stored values is stored as the scalar texel weighting value for the texel.

11. A method according to claim 9, wherein the scalar texel weighting value(s) selected from the plurality of stored values is used to derive a scalar texel weighting value different from the selected scalar texel weighting value(s) and the derived value is stored as the scalar texel weighting value for the texel.

12. A method according to claim 9, wherein the relative values of the colour component weighting values are dependent upon the relative contribution of each colour component to brightness as perceived by a human viewer.

13. A method according to claim 9, wherein the colour component weighting values are such that each respective stored scalar texel weighting value is greater than or equal to the smallest colour component value of the colour component values combined to generate that scalar texel weighting value.

14. A method according to claim 9, wherein the colour component weighting values are such that each respective stored scalar texel weighting value is less than or equal to the largest colour component value of the colour component values combined to generate that scalar texel weighting value.

15. A method according to claim 9, wherein each colour component weighting value is a value less than one, and wherein the sum of the colour component weighting values is equal to one.

16. A method according to claim 9, wherein each texel has red, green and blue colour component values, and wherein the colour component weighting value for the green colour component is greater than the colour component weighting value for the red colour component, and the colour component weighting value for the red colour component is greater than the colour component weighting value for the blue colour component.

17. A method according to claim 16, wherein the colour component weighting values for the green, red and blue colour components are substantially 0.587, 0.299 and 0.114, respectively.

18. A method according to claim 17, wherein each stored scalar texel weighting value, $\sigma$, is calculated in accordance with the following formula, where R, G and B are the respective red, green and blue colour component values for which the texel weighting value is calculated:

$$\sigma = \frac{0.299R^2 + 0.587G^2 + 0.114B^2}{0.299R + 0.587G + 0.114B}.$$

19. Apparatus operable to process data defining a texture map comprising a plurality of texels each having an associated colour vector comprising a plurality of colour component values, to calculate scalar texel weighting values for use in rendering with the texture map and a darkmap representing an inverse of a lightmap comprising an array of vectors, wherein each vector represents illumination at an image location associated with that vector, the apparatus comprising:
- a texel weighting value calculator operable to calculate a respective scalar texel weighting value for each respective one of at least some of the texels by combining each of the colour component values of the texel's associated colour vector such that the contribution of each colour component value of the vector is dependent upon a respective non-zero colour component weighting value; and
- a data writer operable to write each calculated scalar texel weighting value to storage for the corresponding texel for subsequent use to modify the colour component values of a darkmap element when rendering is performed using the texel and the darkmap element.

20. Apparatus according to claim 19, wherein the texel weighting value calculator is operable to calculate each scalar texel weighting value by combining the colour component values of the texel using colour component weighting values having relative values dependent upon the relative contribution of each colour component to brightness as perceived by a human viewer.

21. Apparatus according to claim 19, wherein the texel weighting value calculator is operable to calculate each scalar texel weighting value using colour component weighting values such that every scalar texel weighting value calculated using the colour component weighting values is a value which is greater than or equal to the smallest colour component value of the texel.

22. Apparatus according to claim 19, wherein the texel weighting value calculator is operable to calculate each scalar texel weighting value using colour component weighting values such that every scalar texel weighting value calculated using the colour component weighting values is a value which is than or equal to the largest colour component value of the texel.

23. Apparatus according to claim 19, wherein the texel weighting value calculator is operable to calculate each scalar texel weighting value using colour component weighting values such that each colour component weighting value is a value less than one, and such that the sum of the colour component weighting values is equal to one.

24. Apparatus according to claim 19, wherein the apparatus is operable to process texture maps with each texel having red, green and blue colour component values, and wherein the texel weighting value calculator is operable to calculate each scalar texel weighting value using colour weighting values such that the colour component weighting value for the green colour component is greater than the colour component weighting value for the red colour component, and the colour component weighting value for the red colour component is greater than the colour component weighting value for the blue colour component.

25. Apparatus according to claim 24, wherein the texel weighting value calculator is operable to calculate each scalar texel weighting value using colour component weighting values such that the colour component weighting values for the green, red and blue colour components are substantially 0.587, 0.299 and 0.114, respectively.

26. Apparatus according to claim 25, wherein the texel weighting value calculator is operable to calculate each scalar texel weighting value, $\sigma$, in accordance with the following formula, where R, G and B are the red, green and blue colour component values of the texel, respectively:

$$\sigma = \frac{0.299R^2 + 0.587G^2 + 0.114B^2}{0.299R + 0.587G + 0.114B}.$$

27. Apparatus operable to process data defining a texture map comprising a plurality of texels each having an associated colour vector comprising a plurality of colour component values, to generate scalar texel weighting values for use in rendering with the texture map and a darkmap representing an inverse of a lightmap comprising an array of vectors, wherein each vector represents illumination at an image location associated with that vector, the apparatus comprising:
- a data store storing a plurality of scalar texel weighting values, each stored scalar texel weighting value being indexed by a plurality of colour component values, comprising one for each of the texel colour components of a texel's associated colour vector, and each stored scalar texel weighting value comprising the combination of the indexing colour component values such that the contribution of each colour component value of the vector is dependent upon a respective non-zero colour component weighting value;
- a texel reader operable to read the respective colour component values of a respective texel;
- a texel weighting value selector operable to select at least one scalar texel weighting value from the plurality of stored scalar texel weighting values in dependence upon all of the read colour component values of the texel; and
- a data writer operable to write a scalar texel weighting value to a section of storage for the corresponding texel using the selected scalar texel weighting value(s) for subsequent use to modify the colour component values of a darkmap element when rendering is performed using the texel and the darkmap element.

28. Apparatus according to claim 27, wherein the data writer is arranged to write the selected scalar texel weighting value to storage as the scalar texel weighting value for the corresponding texel.

29. Apparatus according to claim 27, further comprising a value calculator operable to calculate a scalar texel weighting value in dependence upon the scalar texel weighting value(s) selected by the texel weighting value selector, and wherein the data writer is arranged to write the value calculated by the value calculator to storage as the scalar texel weighting value for the corresponding texel.

30. Apparatus according to claim 27, wherein each stored scalar texel weighting value comprises the combination of the indexing colour component values using colour component weighting values having relative values dependent upon the relative contribution of each colour component to brightness as perceived by a human viewer.

31. Apparatus according to claim 27, wherein each stored scalar texel weighting value comprises the combination of the indexing colour component values using colour component weighting values such that each respective stored scalar texel weighting value is greater than or equal to the smallest colour component value of the colour component values combined to generate that scalar texel weighting value.

32. Apparatus according to claim 27, wherein each stored scalar texel weighting value comprises the combination of the indexing colour component values using colour component weighting values such that each respective stored scalar texel weighting value is less than or equal to the largest colour component value of the colour component values combined to generate that scalar texel weighting value.

33. Apparatus according to claim 27, wherein each stored scalar texel weighting value comprises the combination of the indexing colour component values using colour component weighting values such that each colour component weighting value is a value less than one, and such that the sum of the colour component weighting values is equal to one.

34. Apparatus according to claim 27, wherein the apparatus is operable to process texture maps having red, green and blue colour components for each texel, and wherein each stored scalar texel weighting value comprises the combination of the indexing colour component values using colour component weighting values such that the colour component weighting value for the green colour component is greater than the colour component weighting value for the red colour component, and the colour component weighting value for the red colour component is greater than the colour component weighting value for the blue colour component.

35. Apparatus according to claim 34, wherein each stored scalar texel weighting value comprises the combination of the indexing colour component values using colour component weighting values such that the colour component weighting values for the green, red and blue colour components are substantially 0.587, 0.299 and 0.114, respectively.

36. Apparatus according to claim 35, wherein each stored scalar texel weighting value, σ, is calculated in accordance with the following formula, where R, G and B are the respective red, green and blue colour component indexing values for which the scalar texel weighting value is calculated:

$$\sigma = \frac{0.299R^2 + 0.587G^2 + 0.114B^2}{0.299R + 0.587G + 0.114B}.$$

37. A computer readable storage medium storing a computer program comprising instructions for programming a programmable processing apparatus to become operable to perform a method as set out in claim 1 or claim 9.

38. A computer readable storage medium storing a computer program comprising instructions for programming a programmable processing apparatus to become operable to perform a method of processing data defining a texture map comprising a plurality of texels each having a plurality of colour component values, to calculate weighting values for use in rendering with the texture map and a darkmap, the method comprising for each of at least some of the texels:

combining each of the colour component values of the texel to give a texel weighting value for the texel, the combination being carried out such that the contribution of each colour component value is dependent upon a respective non-zero colour component weighting value; and storing the calculated texel weighting value for the texel, wherein the stored computer program further comprises instructions for programming the programmable processing apparatus to become operable to render the texture map data and darkmap data onto a polygon by:

rendering the polygon with the texture map data to generate pixel values and storing the pixel values together with a corresponding texel weighting value for each pixel value; and for each generated pixel value:

multiplying each of the colour component values of the corresponding darkmap element by the texel weighting value for the pixel to give weighted darkmap colour component values;

subtracting each weighted darkmap colour component value from the corresponding colour component value of the pixel; and displaying a pixel rendered using the texel and the darkmap element.

39. A method of generating a computer program product, comprising:

performing a method as set out in claim 1 or claim 9 to generate texture map data defining colour component values for each texel together with a scalar texel weighting value for each texel that is a function of the texel's colour vector comprising the colour component values; and recording the texture map data either directly or indirectly onto a computer readable recording medium.

40. A method of generating a computer program product, comprising:

performing a method as set out in claim 1 or claim 9 to generate texture map data defining colour component values for each texel together with a scalar texel weighting value for each texel that is a function of the texel's colour vector comprising the colour component values;

generating, either directly or indirectly, a signal carrying the texture map data; and storing the signal carrying the texture map data onto a computer readable medium.

41. A computer processing apparatus operable to render three-dimensional computer models comprising a plurality of polygons with texture data from a texture map and darkmap data from a darkmap to generate image data defining an image of the three-dimensional computer model, the apparatus comprising:

one or more data stores storing:

texture map data defining a texture map having a plurality of texels with each texel having a plurality of colour component values and a texel weighting value, each texel weighting value comprising the combination of the respective colour component values of the texel such that the contribution of each colour component value is dependent upon a respective non-zero colour component weighting value;

darkmap data defining a darkmap having a plurality of elements with each element having a plurality of colour component values;

data defining a three-dimensional computer model comprising a plurality of polygons;

a scalar multiplication and vector subtraction unit; and a polygon renderer, operable to control the scalar multiplication and vector subtraction unit to render a polygon in the three-dimensional computer model to generate image data for display;
wherein the polygon renderer is operable to render the polygon with texture map data to generate pixel values and to store the pixel values together with a corresponding texel weighting value for each pixel value; and for each generated pixel value:
the polygon renderer is operable to multiply each of the colour component values of the corresponding darkmap element by the texel weighting value for the pixel to give weighted darkmap colour component values; and the polygon renderer is operable to subtract each weighted darkmap colour component value from the corresponding colour component value of the pixel.

42. A method, performed using a computer processing apparatus, of rendering a three-dimensional computer model comprising a plurality of polygons with texture data from a texture map and darkmap data from a darkmap to generate image data defining an image of the three-dimensional computer model, the method comprising:
storing data comprising:
texture map data defining a texture map having a plurality of texels with each texel having a plurality of colour component values and a texel weighting value, each texel weighting value comprising the combination of the respective colour component values of the texel such that the contribution of each colour component value is dependent upon a respective non-zero colour component weighting value;
darkmap data defining a darkmap having a plurality of elements with each element having a plurality of colour component values;
data defining a three-dimensional computer model comprising a plurality of polygons;
rendering the polygon with texture map data to generate pixel values and storing the pixel values together with a corresponding texel weighting value for each pixel value; and
for each generated pixel value:
multiplying each of the colour component values of the corresponding darkmap element by the texel weighting value for the pixel to give weighted darkmap colour component values;
subtracting each weighted darkmap colour component value from the corresponding colour component value of the pixel; and displaying a pixel rendered using the texel and the darkmap element.

43. A computer readable storage medium storing a computer program for programming a programmable processing apparatus to become operable to perform a method as set out in claim 42.

44. Apparatus operable to process data defining a texture map comprising a plurality of texels each having an associated colour vector comprising a plurality of colour component values, to calculate scalar texel weighting values for use in rendering with the texture map and a darkmap representing an inverse of a lightmap comprising an array of vectors, wherein each vector represents illumination at an image location associated with that vector, the apparatus comprising:
means for calculating a respective scalar texel weighting value for each respective colour vector of one of at least some of the texels by combining each of the colour component values of the texel such that the contribution of each colour component value of the colour vector is dependent upon a respective non-zero colour component weighting value; and means for writing each calculated scalar texel weighting value to storage for the corresponding texel for subsequent use to modify the colour component values of a darkmap element when rendering is performed using the texel and the darkmap element.

45. Apparatus operable to process data defining a texture map comprising a plurality of texels each having an associated colour vector comprising a plurality of colour component values, to generate scalar texel weighting values for use in rendering with the texture map and a darkmap representing an inverse of a lightmap comprising an array of vectors, wherein each vector represents illumination at an image location associated with that vector, the apparatus comprising:
means for storing a plurality of scalar texel weighting values, each stored scalar texel weighting value being indexed by a plurality of colour component values, comprising one for each of the texel colour components, and each stored scalar texel weighting value comprising the combination of the indexing colour component values such that the contribution of each colour component value is dependent upon a respective non-zero colour component weighting value;
means for reading the respective colour component values of a respective texel;
means for selecting at least one scalar texel weighting value from the plurality of stored scalar texel weighting values in dependence upon all of the read colour component values of the texel; and
means for writing a scalar texel weighting value to storage for the corresponding texel using the selected scalar texel weighting value(s) for subsequent use to modify the colour component values of a darkmap element when rendering is performed using the texel and the darkmap element.

46. A computer processing apparatus operable to render three-dimensional computer models comprising a plurality of polygons with texture data from a texture map and darkmap data from a darkmap to generate image data defining an image of the three-dimensional computer model, the apparatus comprising:
means for storing:
texture map data defining a texture map having a plurality of texels with each texel having a plurality of colour component values and a texel weighting value, each texel weighting value comprising the combination of the respective colour component values of the texel such that the contribution of each colour component value is dependent upon a respective non-zero colour component weighting value;
darkmap data defining a darkmap having a plurality of elements with each element having a plurality of colour component values;
data defining a three-dimensional computer model comprising a plurality of polygons;
means for performing scalar multiplication and vector subtraction; and
means for controlling the scalar multiplication unit to render a polygon in the three-dimensional computer model to generate image data for display by:
rendering the polygon with texture map data to generate pixel values and storing the pixel values together with a corresponding texel weighting value for each pixel value; and for each generated pixel value:
multiplying each of the colour component values of the corresponding darkmap element by the texel weighting value for the pixel to give weighted darkmap colour component values; and
subtracting each weighted darkmap colour component value from the corresponding colour component value of the pixel.

47. A computer readable storage medium storing a computer program comprising instructions for programming a programmable processing apparatus to become operable to perform a method of processing data defining a texture map comprising a plurality of texels each having a plurality of colour component values, to generate weighting values for use in rendering with the texture map and a darkmap, the method comprising for each of at least some of the texels:
reading the respective colour component values of the texel;
selecting at least one texel weighting value from a plurality of stored texel weighting values in dependence upon all of the read colour component values of the texel; and
storing a texel weighting value for the texel using the selected texel weighting value(s);
wherein each stored texel weighting value comprises the combination of a plurality of colour component values, comprising one for each of the texel colour components, such that the contribution of each colour component value is dependent upon a respective non-zero colour component weighting value;
and wherein the stored computer program further comprises instructions for programming the programmable processing apparatus to become operable to render the texture map data and darkmap data onto a polygon by:
rendering the polygon with the texture map data to generate pixel values and storing the pixel values together with a corresponding texel weighting value for each pixel value; and
for each generated pixel value:
multiplying each of the colour component values of the corresponding darkmap element by the texel weighting value for the pixel to give weighted darkmap colour component values; and
subtracting each weighted darkmap colour component value from the corresponding colour component value of the pixel.

* * * * *